(12) United States Patent  
Uchiyama

(10) Patent No.: US 9,317,220 B2  
(45) Date of Patent: Apr. 19, 2016

(54) DATA MANAGEMENT APPARATUS AND CONTROL METHOD OF DATA MANAGEMENT APPARATUS

(71) Applicant: FUJITSU LIMITED, Kawasaki-shi, Kanagawa (JP)

(72) Inventor: Kenji Uchiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 162 days.

(21) Appl. No.: 14/301,400

(22) Filed: Jun. 11, 2014

(65) Prior Publication Data

US 2015/0012716 A1 Jan. 8, 2015

(30) Foreign Application Priority Data

Jul. 4, 2013 (JP) ................................. 2013-140839

(51) Int. Cl.
| | |
|---|---|
| G06F 12/06 | (2006.01) |
| G06F 3/06 | (2006.01) |
| G06F 11/14 | (2006.01) |
| G11B 23/04 | (2006.01) |

(Continued)

(52) U.S. Cl.
CPC ............ *G06F 3/0658* (2013.01); *G06F 3/0604* (2013.01); *G06F 3/0673* (2013.01); *G06F 3/0682* (2013.01); *G06F 11/1458* (2013.01); *G11B 15/689* (2013.01); *G11B 15/6835* (2013.01); *G11B 23/042* (2013.01); *G11B 25/10* (2013.01); *G11B 27/002* (2013.01); *G06F 3/0686* (2013.01); *G06F 2003/0697* (2013.01); *G11B 15/02* (2013.01); *G11B 2220/41* (2013.01); *G11B 2220/93* (2013.01)

(58) Field of Classification Search
CPC ...... G06F 3/0686; G06F 3/0682; G11B 15/02; G11B 15/0689
USPC ........................................................ 711/4, 112
See application file for complete search history.

(56) References Cited

U.S. PATENT DOCUMENTS 5,634,032 A 5/1997 Haddock
2004/0088507 A1* 5/2004 Satoyama et al. ............ 711/162

(Continued)

FOREIGN PATENT DOCUMENTS

| EP | 2063429 A1 | 5/2009 |
| JP | 2003-331560 | 11/2003 |

(Continued)

OTHER PUBLICATIONS

Extended European Search Report issued on Jan. 5, 2015 for corresponding European Patent Application No. 14172347.8, 6 pages.

*Primary Examiner* — Than Nguyen
(74) *Attorney, Agent, or Firm* — Fujitsu Patent Center

(57) ABSTRACT

A data management apparatus has a first storage unit, a first selecting unit, a second selecting unit, and a second storage unit. The first storage unit stores data associated with first identification information. When writing data out to a storage medium, the first selecting unit selects a first storage medium on which the first identification information corresponding to the data to be written out is displayed, from among a plurality of storage media. When the first storage medium is not available, the second selecting unit selects a second storage medium attached with a display unit configured to display stored information, from among the plurality of storage media, and stores the first identification information in the display unit of the second storage medium.

6 Claims, 23 Drawing Sheets

(51) Int. Cl.
*G11B 25/10* (2006.01)
*G11B 15/68* (2006.01)
*G11B 27/00* (2006.01)
*G11B 15/02* (2006.01)

(56) References Cited

U.S. PATENT DOCUMENTS

| | | | |
|---|---|---|---|
| 2007/0174566 A1* | 7/2007 | Kaneda et al. | 711/162 |
| 2008/0091896 A1* | 4/2008 | Usami | 711/162 |
| 2009/0327599 A1* | 12/2009 | Nonaka et al. | 711/112 |
| 2010/0046108 A1 | 2/2010 | Anna et al. | |
| 2013/0282997 A1* | 10/2013 | Suzuki et al. | 711/162 |

FOREIGN PATENT DOCUMENTS

| | | |
|---|---|---|
| JP | 2006-323918 | 11/2006 |
| JP | 4918940 | 4/2012 |
| WO | 2009-040954 | 4/2009 |

\* cited by examiner

EXEMPLARY PV MANAGEMENT DATABASE

| REFERENCE NUMBER | PV NUMBER | TAPE LIBRARY NAME | BELONGING-PVG NAME | PV STATE | LABEL INFORMATION | DATA STORAGE STATUS ||| NUMBER OF LVs |
| --- | --- | --- | --- | --- | --- | --- | --- | --- | --- |
| | | | | | | TOTAL CAPACITY | BEING USED | UNUSED | |
| 001 | LTO123 | LIB0 | BASE | o | WITH IC-TAG | 20 TB | 14 TB | 6 TB | 2 |
| 002 | LTO124 | LIB0 | BASE | wd | WITH IC-TAG | 20 TB | 10 TB | 10 TB | 1 |
| 003 | LTO131 | LIB0 | BASE | f | BAR CODE | 20 TB | 20 TB | 0 TB | 4 |
| 004 | LTO221 | LIB1 | TR-PVG | – | WITHOUT LABEL | 20 TB | 5 TB | 15 TB | 1 |
| 005 | LTO223 | LIB1 | BASE | rd | BAR CODE | 20 TB | 15 TB | 5 TB | 3 |
| ... | ... | ... | ... | ... | ... | ... | ... | ... | ... |

| ITEM | BRANCH CONDITION |
|---|---|
| TYPE #1 | PV TO BE EXPORTED BEING NOT AVAILABLE |
| TYPE #2 | ABNORMALITY OCCURRED IN DRIVE WHILE COPYING & EJECTION OF PV BEING PREVENTED & SUBSTITUTE DRIVE EXISTING |
| TYPE #3 | ABNORMALITY OCCURRED IN ROBOT GRIPPING PV & EJECTION OF PV BEING PREVENTED & SUBSTITUTE ROBOT EXISTING |
| TYPE #4 | OTHER THAN TYPES #1 TO #3 |
| TIME OF OCCURRENCE #1 | BEFORE MOVING PV TO DRIVE |
| TIME OF OCCURRENCE #2 | WHILE MOVING PV TO DRIVE, CELL, OR CARTRIDGE DELIVERY MECHANISM |
| TIME OF OCCURRENCE #3 | WHILE COPYING |

FIG. 22
(A) REWRITE MANAGEMENT INFORMATION OF PV FOR EXPORT
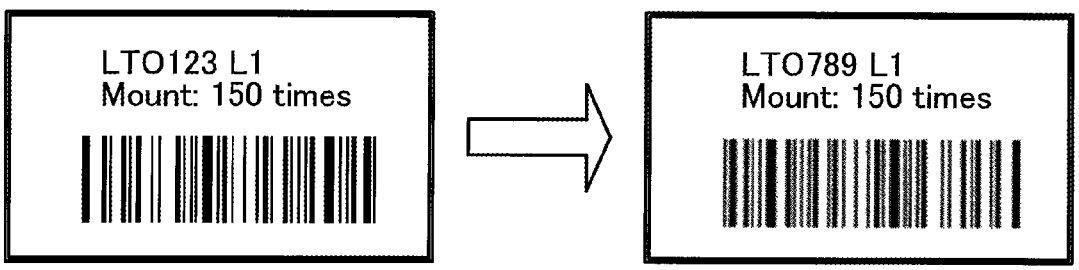
(B) REWRITE MANAGEMENT INFORMATION IN OCCURRENCE OF PV ABNORMALITY
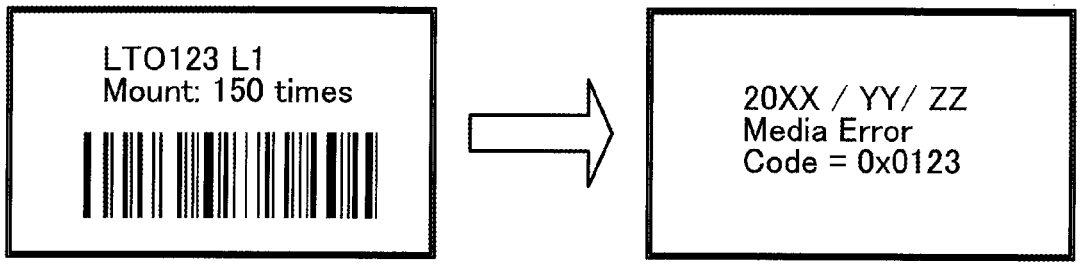
(C) REWRITE MANAGEMENT INFORMATION IN THE EVENT OF EXCEEDED LIMIT NUMBER OF TIMES USED
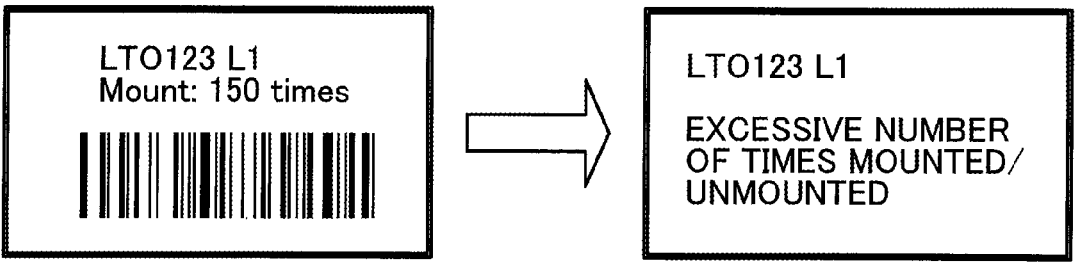
(D) REWRITE MANAGEMENT INFORMATION IN THE EVENT OF EXCEEDED LIMIT NUMBER OF TIMES WRITTEN
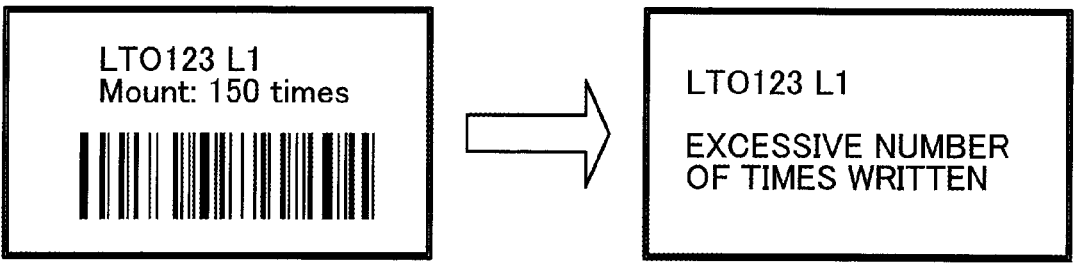

(E) WRITE MANAGEMENT
    INFORMATION OF UNUSED PV
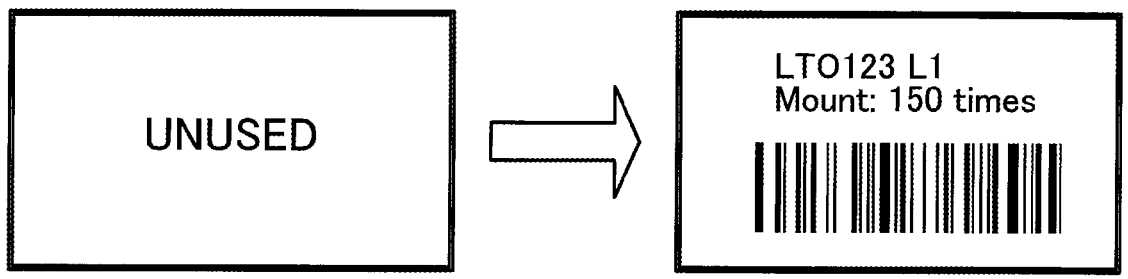
(F) WRITE MANAGEMENT INFORMATION
    OF UNREGISTERED PV
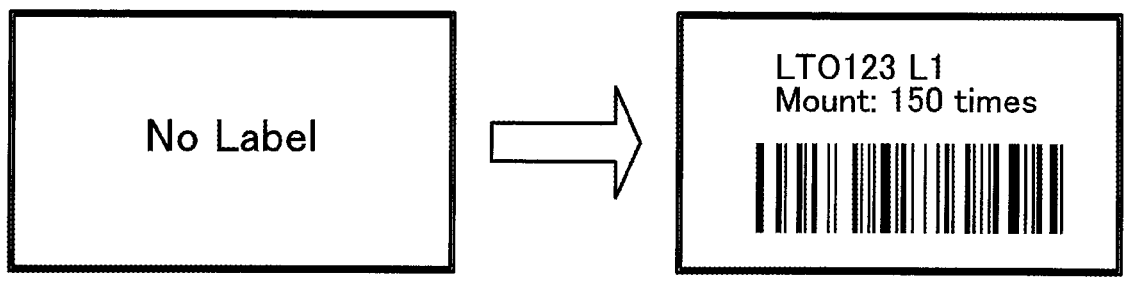
FIG. 23

DATA MANAGEMENT APPARATUS AND CONTROL METHOD OF DATA MANAGEMENT APPARATUS

CROSS-REFERENCE TO RELATED APPLICATION

This application is based upon and claims the benefit of priority of the prior Japanese Patent Application No. 2013-140839, filed on Jul. 4, 2013, the entire contents of which are incorporated herein by reference.

FIELD

The embodiments discussed herein relate to a data management apparatus and a control method of the data management apparatus.

BACKGROUND

Tape library systems using tape media with large storage capacity are widely used for backing up large amount of data. Such a tape library system has a library device including a plurality of receiving slots which receives tape media, and a robot which transports the tape media from the receiving slots to a physical drive. In performing a backup process, for example, the robot of the library device extracts a tape medium from a receiving slot and mounts the extracted tape medium on the physical drive. Subsequently, data to be backed up is written into the tape medium via the physical drive. Accordingly, with the tape library system, operations such as mounting the tape medium take substantial time when performing the backup process.

Accordingly, there is recently proposed a virtual library system which uses a disk array capable of high-speed data access to omit the time taken for operations such as mounting the tape medium, achieving faster reading and writing of data. The virtual library system, having a virtual tape device with a disk array installed between a host computer and a library device, treats reading from and writing to a logical volume on the disk array as virtually reading from and writing to a tape medium. Data of the logical volume is written out to the tape medium of the library device by the virtual tape device at a certain timing from the disk array. Such write out to the tape medium is sometimes referred to as migration.

The above-mentioned logical volume and the logical drive having the logical volume mounted thereon are implemented on a disk array. Therefore, high-speed data reading and writing may be realized without a physical mounting operation. It goes without saying that using a disk array capable of accessing data faster than a tape medium may also shorten the time taken for the data read/write process.

In addition, the virtual tape device has a function of writing the data of the logical volume to a tape medium according to an instruction received from the host computer and allowing the tape medium to be ejected from the library device (referred to as an export function in the following). The export function is used when transporting the tape medium having the data of the logical volume written thereon to another center, for example, and causing a virtual tape device installed at the other center to read the tape medium and move the logical volume.

The tape medium to which the data of the logical volume is written is attached with label information relating to the identification information of the logical volume. For example, when reading data of a logical volume specified by the virtual tape device from a tape medium, the library device selects a desired tape medium, referring to the label information. When writing the data of the logical volume specified by the virtual tape device into a tape medium, the library device also selects a desired tape medium, referring to the label information. As a method of displaying the label information, a paper tape having the label information written thereon may be attached to the tape medium, for example.

There is proposed a method of sticking, to a storage medium, an electronic paper having numbers displayed thereon based on electrical signals. In addition, there is proposed an LTO (Linear Tape-Open) tape driving device having an LTO tape drive and an IC (Integrated Circuit) tag reader/writer. The LTO tape drive device, upon loading an LTO having a magnetic tape and an IC tag, writes data into the magnetic tape of the LTO, and also writes, into the IC tag, data-related information such as target identification number and content of backup data.

Please see, for example, Japanese Patent No. 4918940, Japanese Laid-Open Patent Publication No. 2003-331560, and Japanese Laid-Open Patent Publication No. 2006-323918.

Although the method of attaching a paper tape having the label information written thereon to the tape medium is simple, there may arise in the event of tape medium failure a task of manually reattaching the paper tape to a substitute tape medium. When the aforementioned LTO tape drive device is being used, a user who has recognized a failure of the tape medium performs a task of reloading another tape medium on the LTO tape drive device so that information is written into an IC tag of the other tape medium. However, writing data into the tape medium is interrupted while the user is performing the task, and therefore it takes long time for write out of data.

SUMMARY

According to an aspect, there is provided a data management apparatus having a first storage unit configured to store data associated with first identification information; a first selecting unit configured to select a first storage medium on which first identification information corresponding to data to be written out is displayed, from among a plurality of storage media when writing the data out to a storage medium; and a second selecting unit configured to select a second storage medium attached with a display unit configured to display stored information, from among the plurality of storage media, and store the first identification information in the display unit of the second storage medium, when the first storage medium is not available.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 illustrates exemplary management information managed by the server device according to the second embodiment;

FIG. 21 illustrates a branch condition of a branching process included in the exemplary export process (in consideration of occurrence of abnormality) according to the second embodiment;

FIG. 22 illustrates an exemplary rewriting method of management information according to the second embodiment; and FIG. 23 illustrates an exemplary writing method of management information according to the second embodiment.

DESCRIPTION OF EMBODIMENTS

Figure 1:
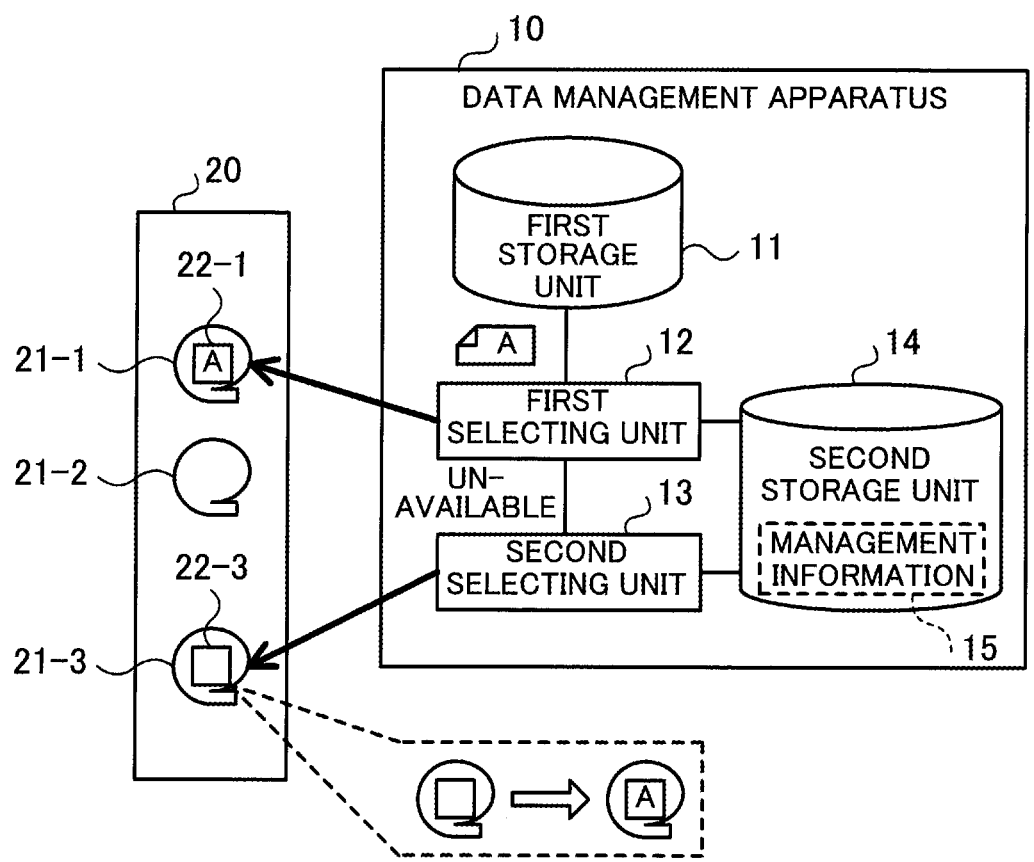
FIG. 1 illustrates an exemplary data management apparatus according to a first embodiment.

Several embodiments will be described below with reference to the accompanying drawings, wherein like reference numerals refer to like elements throughout, and duplicated explanation thereof will be omitted.

1. First Embodiment

A first embodiment will be described, referring to FIG. 1. FIG. 1 illustrates an exemplary data management apparatus according to the first embodiment.

As illustrated in FIG. 1, a data management apparatus 10 has a first storage unit 11, a first selecting unit 12, a second selecting unit 13, and a second storage unit 14. In addition, the data management apparatus 10 is connected to a library device 20.

The library device 20 has a plurality of storage media 21-1, . . . , 21-3 housed therein. The storage medium 21-1 has a display unit 22-1 and the storage medium 21-3 has a display unit 22-3. The storage media 21-1, . . . , 21-3 are, for example, magnetic storage media such as magnetic tapes, optical storage media such as optical disks, optical magnetic storage media, semiconductor memories, or the like. In addition, the storage media 21-1, . . . , 21-3 may be portable storage media which may be ejected from the library device 20. The display units 22-1 and 22-3 are, for example, display devices such as an electronic paper with an IC-tag having a wireless communication function and a data holding function.

The first storage unit 11 and the second storage unit 14 may be volatile storage devices such as RAMs (Random Access Memory), or non-volatile storage devices such as HDDs (Hard Disk Drive) or flash memories. The first selecting unit 12 and the second selecting unit 13 may be processors such as CPUs (Central Processing Unit) or DSPs (Digital Signal Processor). The first selecting unit 12 and the second selecting unit 13 may be electronic circuits other than processors such as ASICs (Application Specific Integrated Circuit) or FPGAs (Field Programmable Gate Array). The first selecting unit 12 and the second selecting unit 13 execute programs stored in, for example, the first storage unit 11, the second storage unit 14, or another memory.

The first storage unit 11 stores data associated with first identification information. For example, the first storage unit 11 has one or more logical volumes stored therein, with the first identification information being associated with each logical volume to identify the logical volumes one by one. In such a case, the data of the logical volume stored in the first storage unit 11 are managed using the first identification information.

Here, let us consider a situation where data corresponding to first identification information A, among the data stored in the first storage unit 11, is to be written out to a storage medium provided in the library device 20. In such a case, the first selecting unit 12 selects the first storage medium 21-1 on which the first identification information A corresponding to the data to be written is displayed, from among the storage media 21-1, . . . , 21-3. When the first storage medium 21-1 is available, the first storage medium 21-1 selected by the first selecting unit 12 is used for write out of data.

However, when the first storage medium 21-1 is not available, the second selecting unit 13 selects the second storage medium 21-3 attached with the display unit 22-3 displaying the stored information, from among the storage media 21-1, . . . , 21-3. Furthermore, the second selecting unit 13 stores the first identification information A in the display unit 22-3 of the second storage medium 21-3. The display unit 22-3 having stored the first identification information A displays the first identification information A stored therein. In other words, the second storage medium 21-3 becomes the storage medium having the first identification information A displayed thereon. Accordingly, it becomes possible to use the second storage medium 21-3 for write out of data in place of the first the storage medium 21-1.

The second storage unit 14 may store, for each of the storage media 21-1, . . . , 21-3, management information 15 associating the second identification information for identifying the storage medium with information indicating presence or absence of a display unit. In such a case, the second selecting unit 13 may easily select the second storage medium 21-3 based on the management information 15. When the display units 22-1 and 22-3 are devices having a wireless communication function, presence or absence of the display units 22-1 and 22-3 may be determined by checking whether or not wireless access to the display units 22-1 and 22-3 is possible. The second selecting unit 13 may select the second storage medium 21-3 by a determination method using such a wireless communication function.

The first embodiment has thus been described above. Applying the technique according to the first embodiment, a substitute storage medium may be automatically prepared even when a storage medium to which data is to be written is not available. Therefore, it becomes possible to accelerate writing data out to a substitute storage medium in occurrence of abnormality.

2. Second Embodiment

Next, a second embodiment will be described.

2-1. System

Figure 2:
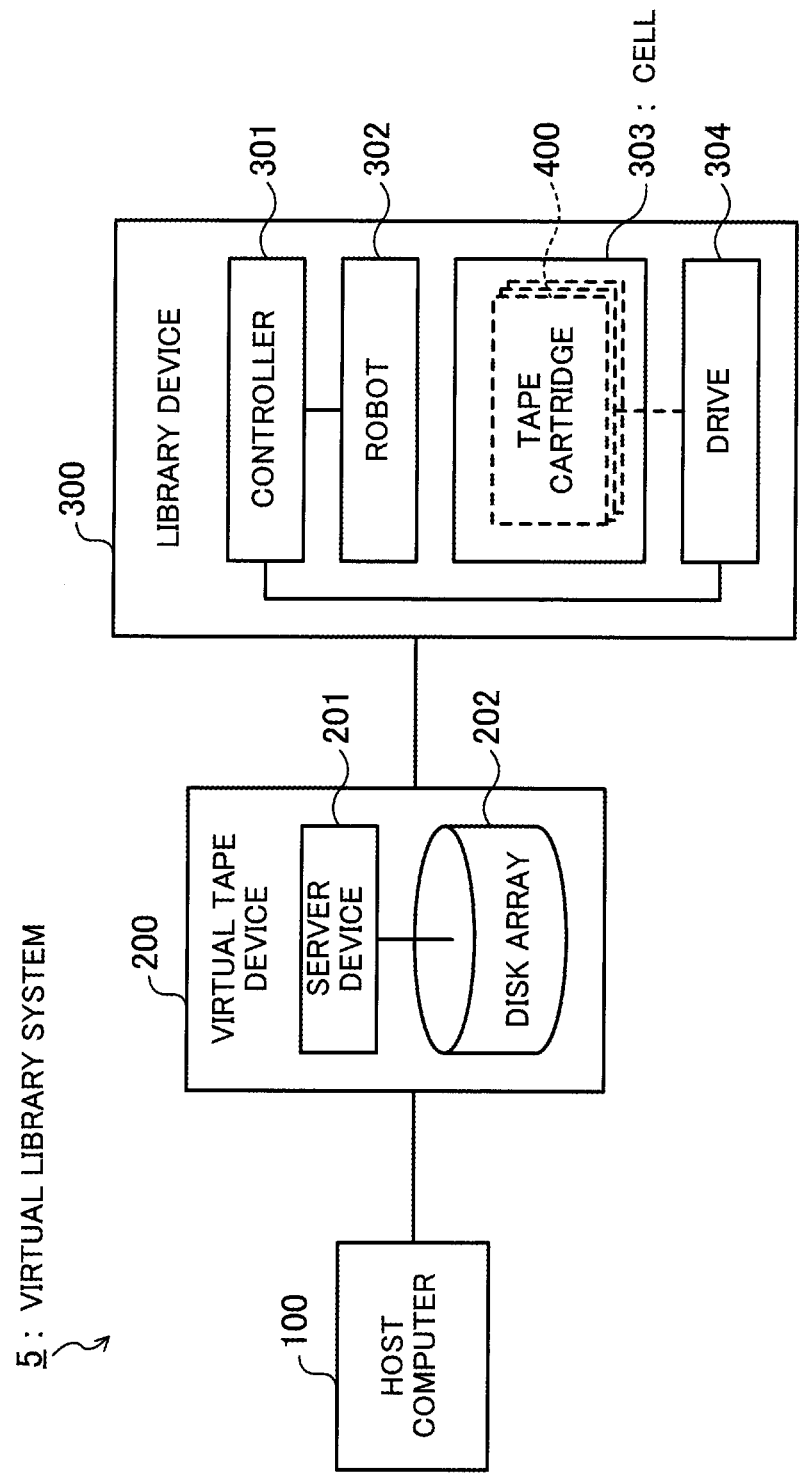
FIG. 2 illustrates an exemplary virtual library system according to a second embodiment.

A virtual library system 5 according to the second embodiment will be described, referring to FIG. 2. FIG. 2 illustrates an exemplary virtual library system according to the second embodiment.

As illustrated in FIG. 2, the virtual library system 5 includes a host computer 100, a virtual tape device 200, and a library device 300.

The host computer 100 requests the virtual tape device 200 to read or write data. In addition, the host computer 100 requests an export process of writing data of a logical volume held by the virtual tape device 200 to a tape cartridge 400 and ejecting the tape cartridge 400 from the library device 300. For such requests, the virtual tape device 200 behaves as a tape library. However, the virtual tape device 200 performs the process using a disk array 202 described below.

The virtual tape device 200 has a server device 201 and a disk array 202. The disk array 202 is an exemplary storage device capable of high-speed data access. The disk array 202 is a storage device configured as a RAID (Redundant Arrays of Inexpensive Disks) using a plurality of physical disks, for example.

Each of the physical disks in the disk array 202 is managed as a unit referred to as a Volume Group (VG). With a virtual partition being logically set up on a volume group, reading or writing of data is performed assuming the virtual partition to be a physical disk. The virtual partition is referred to as a Logical Volume (LV). Data access is allowed by mounting a logical volume on a logically set up logical drive assumed to be a physical drive.

The server device 201 manages the aforementioned logical volume. For example, the server device 201, upon receiving a data write request from the host computer 100, mounts on the logical drive a logical volume into which data is to be written, and writes the data received from the host computer 100 into the logical volume. In addition, the server device 201, upon receiving a data read request from the host computer 100, mounts on the logical drive a logical volume from which data is to be read, reads the data from the logical volume, and transmits the data to the host computer 100. In addition, the server device 201 performs the export process according to the request received from the host computer 100.

The library device 300 has a controller 301, a robot 302, a cell 303, and a drive 304. There may be two or more cells 303 and drives 304. The controller 301 controls the operation of the robot 302. In addition, the controller 301 writes data into a tape cartridge 400 mounted on the drive 304. Furthermore, the controller 301 reads data from the tape cartridge 400 mounted on the drive 304.

The robot 302, being controlled by the controller 301, extracts the tape cartridge 400 from the cell 303 and transports it to the drive 304. In addition, the robot 302, being controlled by the controller 301, transports the tape cartridge 400 from the drive 304 to the cell 303. The cell 303 is a repository for housing the tape cartridge 400. In the export process, for example, after data of a logical volume has been written into the tape cartridge 400 mounted on the drive 304, the tape cartridge 400 is transported to the ejection port of the housing by the robot 302.

(Label Information of Tape Cartridge)

Here, information (label information) displayed on a label attached to the tape cartridge 400 will be described. For example, on the label of the tape cartridge 400, information relating to data stored in the tape cartridge 400 or information for managing the tape cartridge 400 is displayed.

For example, a user recognizes a logical volume stored in the tape cartridge 400 and manages the tape cartridge 400 by referring to the label information. In addition, identification information (also referred to as LV number, in the following) of a logical volume stored in the tape cartridge 400 has been preliminarily written on the label, and the identification information is read by the controller 301 and used for selecting the tape cartridge 400.

For example, when performing the export process for data of a logical volume specified by the host computer 100, the server device 201 notifies the controller 301 of an LV number corresponding to the target logical volume and causes the controller 301 to prepare the tape cartridge 400. In this occasion, the controller 301 reads the label information of the tape cartridge 400 in the cell 303, and selects the tape cartridge 400 on which the notified LV number is displayed. The controller 301 then controls the robot 302 to mount the selected tape cartridge 400 on the drive 304.

Subsequently, the server device 201 writes the data of the logical volume to the tape cartridge 400 via the controller 301, and causes the robot 302 to transport the tape cartridge 400 to the ejection port of the housing.

When there does not exist the tape cartridge 400 on which a LV number of a logical volume to be the target of the export process is displayed, the process abnormally terminates unless a substitute tape cartridge 400 is prepared. In addition, even when there exists the tape cartridge 400 on which the LV number of the logical volume to be the target of the export process is displayed, the aforementioned process abnormally terminates unless a substitute tape cartridge 400 is prepared when the tape cartridge 400 is not available. In addition, when the robot 302 or the drive 304 fails and thus it is impossible to extract the tape cartridge 400, the process also abnormally terminates. A similar circumstance exists also in a process performed according to a data write request.

In the aforementioned case, applying a mechanism according to the second embodiment described below makes it possible to quickly prepare a substitute tape cartridge 400. A function of hardware and a device which are capable of realizing such a mechanism will be described below.

2-2. Hardware and Data Structure

Referring to FIGS. 3 to 10, hardware of a device included in the virtual library system 5, and a data structure of the disk array 202, or the like will be described.

(Host Computer)

Figure 3:
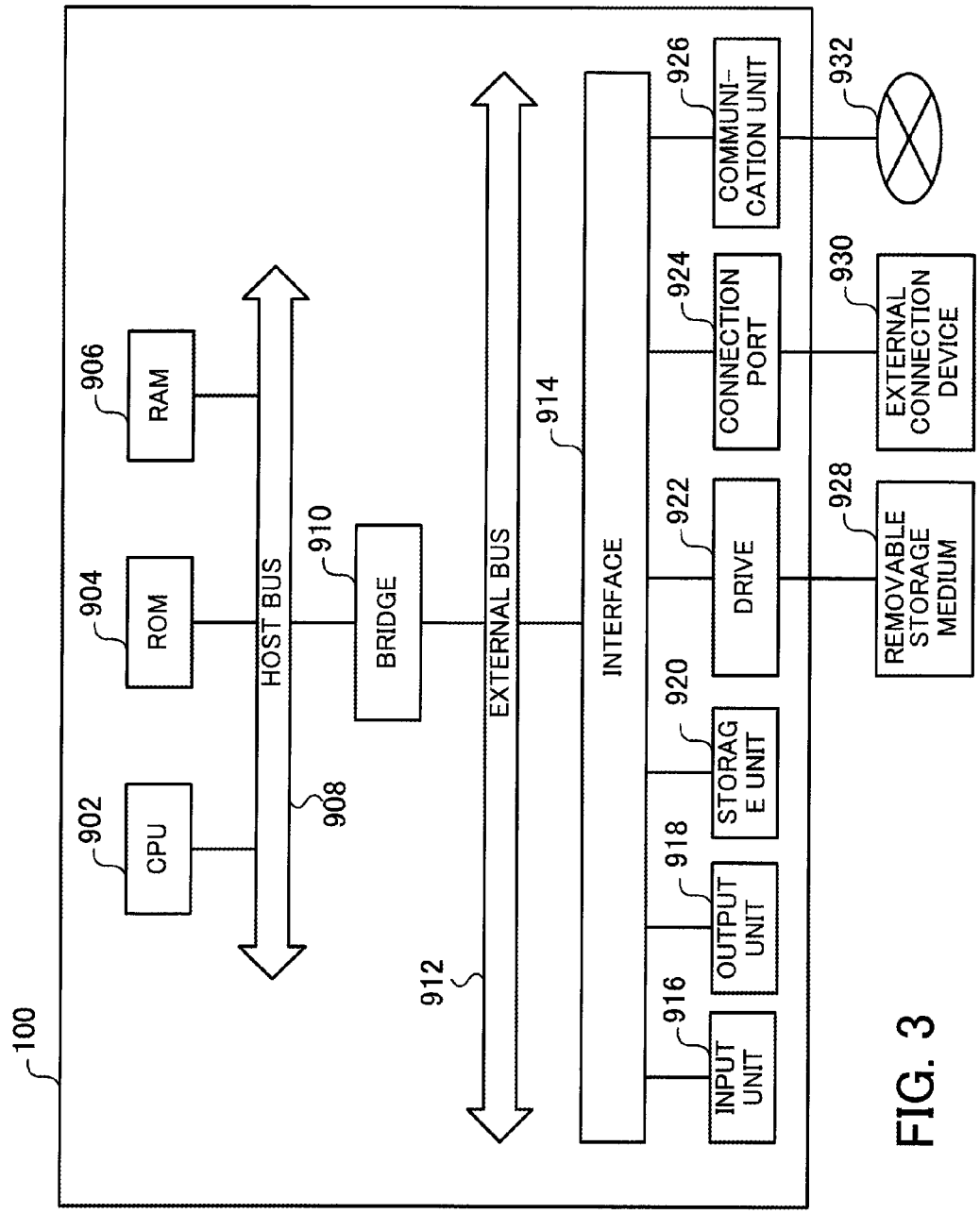
FIG. 3 illustrates exemplary hardware of a host computer according to the second embodiment.

Hardware of the host computer 100 will be described. The function of the host computer 100 may be realized by hardware resources of an information processing apparatus illustrated in FIG. 3, for example. In other words, the function of the host computer 100 is realized by controlling the hardware illustrated in FIG. 3 using a computer program. FIG. 3 illustrates exemplary hardware of the host computer according to the second embodiment.

As illustrated in FIG. 3, the hardware has, mainly, a CPU 902, a ROM (Read Only Memory) 904, a RAM 906, a host bus 908, and a bridge 910. Furthermore, the hardware has an external bus 912, an interface 914, an input unit 916, an output unit 918, a storage unit 920, a drive 922, a connection port 924, and a communication unit 926.

The CPU 902 functions as an arithmetic processing unit or a control unit, for example, and controls all or a part of operations of respective components based on various programs stored in the ROM 904, the RAM 906, the storage unit 920, or a removable storage medium 928. The ROM 904 is an exemplary storage device which stores programs to be read into the CPU 902 or data to be used for arithmetic processing. The RAM 906 temporarily or permanently stores therein a program to be read into the CPU 902, for example, or various parameters which may vary when executing the program.

These components are connected to each other via the host bus 908, for example, which is capable of high-speed data transmission. On the other hand, the host bus 908 is connected, via the bridge 910 for example, to the external bus 912 having a relatively low data transmission speed. In addition, a mouse, a keyboard, a touch panel, a touch pad, a button, a switch, a lever, or the like is used, for example, as the input unit 916. Furthermore, a remote controller capable of transmitting control signals using infrared ray or other radio waves may also be used as the input unit 916.

For example, a display unit such as a CRT (Cathode Ray Tube), an LCD (Liquid Crystal Display), a PDP (Plasma Display Panel), or an ELD (Electro-Luminescence Display) is used as the output unit 918. In addition, an audio output device such as a loud speaker, a headphone or the like, or a printer may also be used as the output unit 918. In other words, the output unit 918 is a device capable of outputting information visually or audibly.

The storage unit 920 is a device for storing various data. For example, a magnetic storage device such as an HDD is used as the storage unit 920. In addition, a semiconductor storage device such as an SSD (Solid State Drive) or a RAM disk, an optical storage device, or an optical magnetic storage device may be used as the storage unit 920.

The drive 922 is a device which reads information stored in the removable, i.e., attachable and detachable storage medium 928, or writes information into the removable storage medium 928. For example, a magnetic disk, an optical disk, an optical magnetic disk, a semiconductor memory, or the like is used as the removable storage medium 928.

The connection port 924 is a port for connecting an external connection device 930 such as a USB (Universal Serial Bus) port, an IEEE 1394 port, a SCSI (Small Computer System Interface), an RS-232C port, an optical audio terminal, or the like, for example. For example, a printer is used as the external connection device 930.

The communication unit 926 is a communication device for connecting to a network 932. For example, a communication circuit for wired or wireless LAN (Local Area Network), a communication circuit for WUSB (Wireless USB), a communication circuit and a router for optical communication, a communication circuit and a router for ADSL (Asymmetric Digital Subscriber Line), a communication circuit for a mobile phone network, or the like is used as the communication unit 926. The network 932 connected to the communication unit 926 is a network connected in a wired or wireless manner and includes the Internet, a LAN, a broadcast network, a satellite communication network, or the like, for example.

(Virtual Tape Device)

Figure 4:
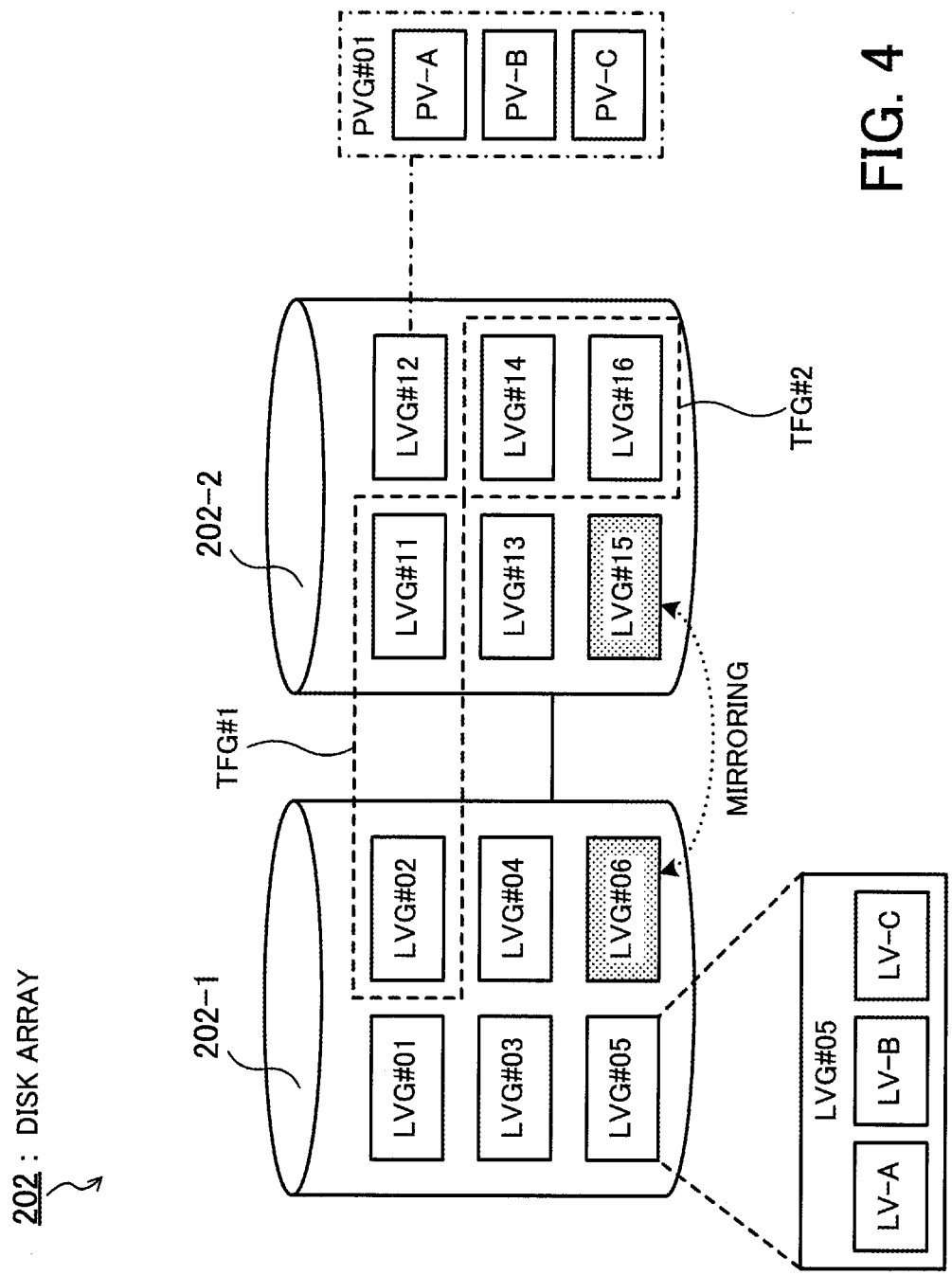
FIG. 4 illustrates an exemplary disk array according to the second embodiment.

Next, hardware of the server device 201 provided in the virtual tape device 200 and a data structure of the logical volume stored in the disk array 202 will be described. The Hardware of the server device 201 is the same as the hardware of the host computer 100. Therefore, the function of the server device 201 may be realized by the hardware illustrated in FIG. 3. The disk array 202 is configured by connecting a plurality of storage devices such as HDDs or SSDs, for example. In the example of FIG. 4, the disk array 202 configured by connecting two storage devices 202-1 and 202-2 to each other is illustrated.

In the disk array 202 provided in the virtual tape device 200, management of the logical volume is performed by a data structure as illustrated in FIG. 4. FIG. 4 illustrates an exemplary disk array according to the second embodiment. When setting a file system in the disk array 202, the virtual tape device 200 may define a desired physical volume as a TFG (Tape File system Group). In addition, a physical volume which is not defined as a TFG is treated as a Floating region. In the example of FIG. 4, TFGs #1 and #2 are set, whereas other regions are treated as floating regions.

An LVG (Logical Volume Group) to which a logical volume LV belongs may be set up to the logical volume LV stored in the disk array 202. In the example of FIG. 4, LVGs #01 to #06 are stored in the storage device 202-1, and LVGs #11 to #16 are stored in the storage device 202-2. In addition, three logical volumes LV-A, LV-B and LV-C belong to LVG #05. An LVG may be assigned to a TFG. In the example of FIG. 4, LVGs #02 and #11 are assigned to TFG #1, and LVGs #14 and #16 are assigned to TFG #2. Other LVGs use floating regions.

In addition, mirroring may be set up for each LVG. In the example of FIG. 4, mirroring is set up between LVGs #06 and #15. In addition, a Physical Volume (PV) may also be managed by a Physical Volume Group (PVG), similarly to an LVG. A link relation may be set up as appropriate between an LVG and a PVG.

In the example of FIG. 4, a link relation is set up between PVG #01 and LVG #12. In such a case, updating data of an LV belonging to LVG #12 causes the updated data to be written into a PV belonging to PVG #01. In addition, management information used by the server device 201 for management is also stored in the disk array 202.

(Library Device)

Figure 5:
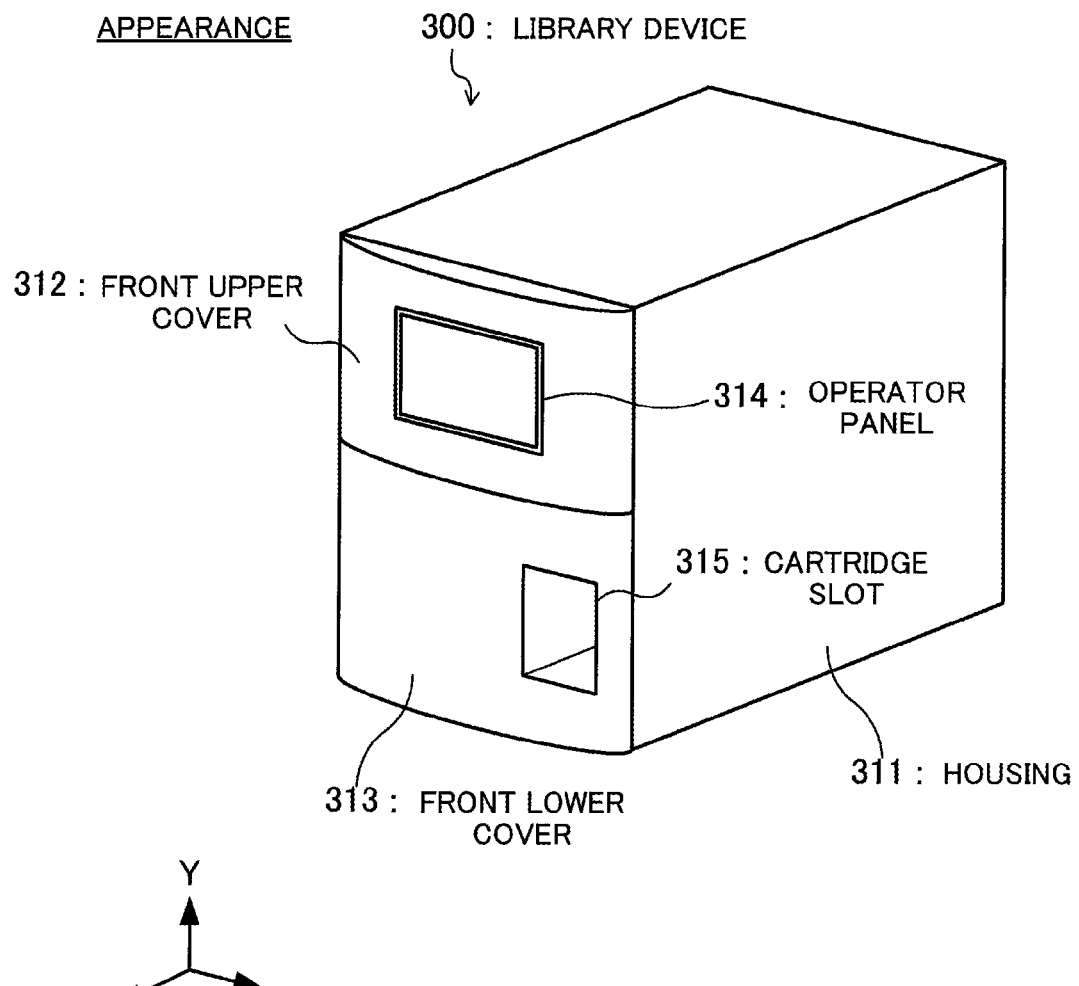
FIG. 5 illustrates exemplary hardware (appearance of the housing) of a library device according to the second embodiment.
Figure 6:
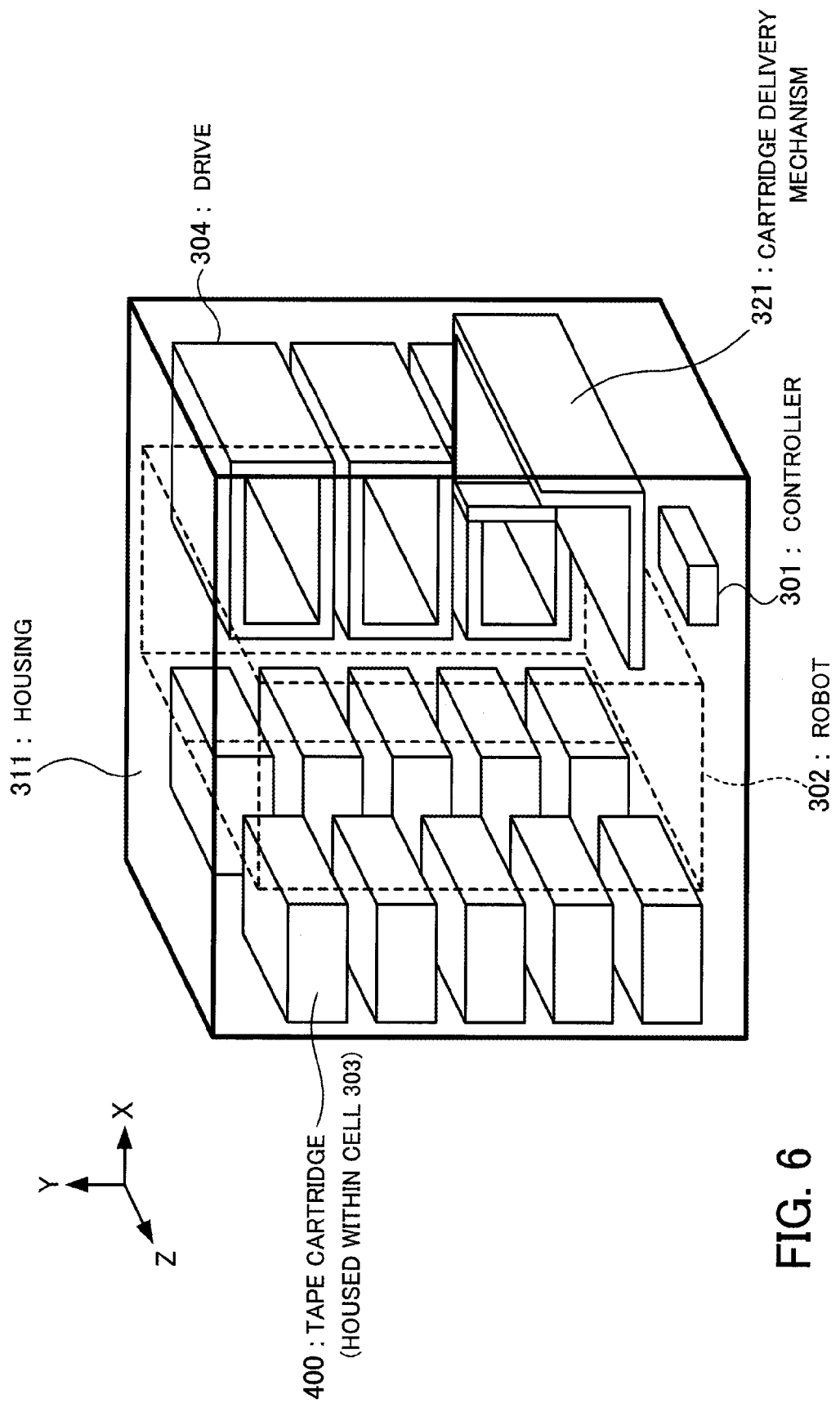
FIG. 6 illustrates exemplary hardware (interior of the housing) of the library device according to the second embodiment.
Figure 7:
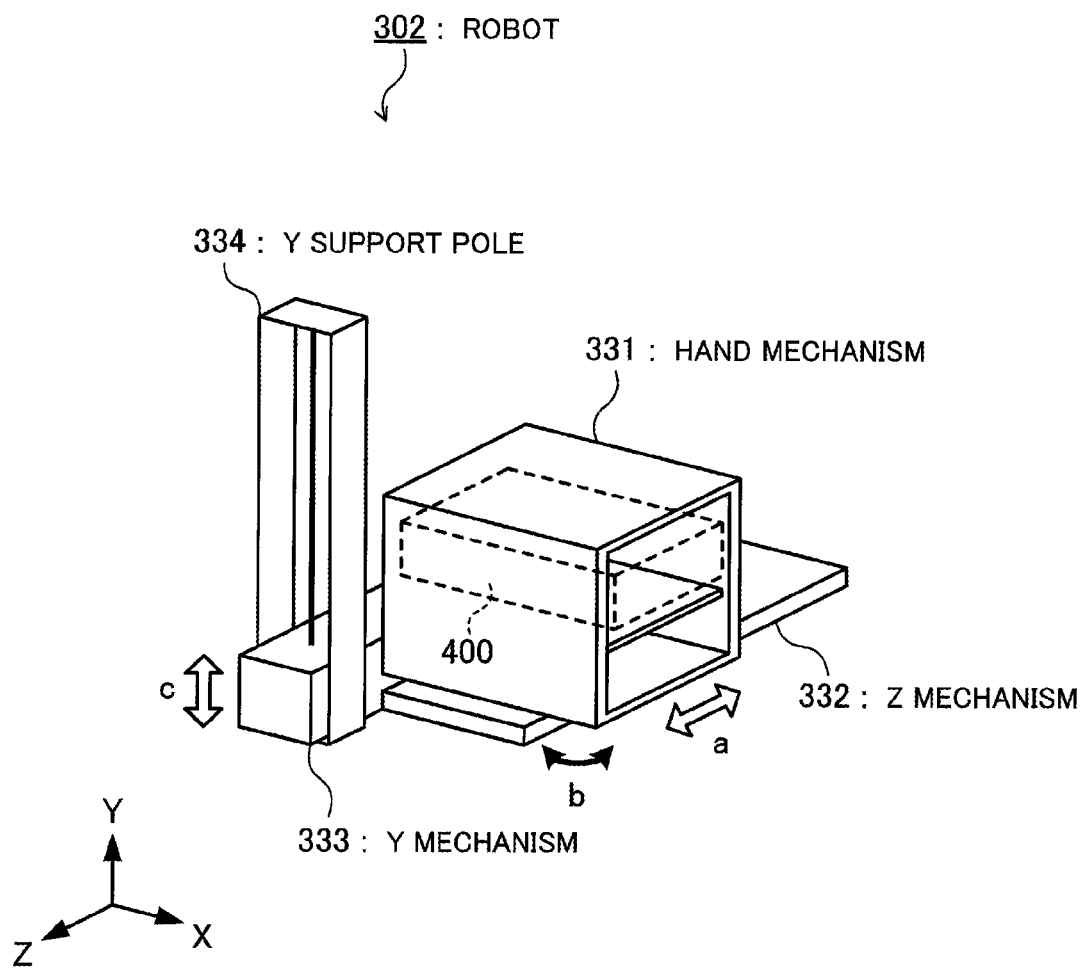
FIG. 7 illustrates exemplary hardware (robot) of the library device according to the second embodiment.
Figure 8:
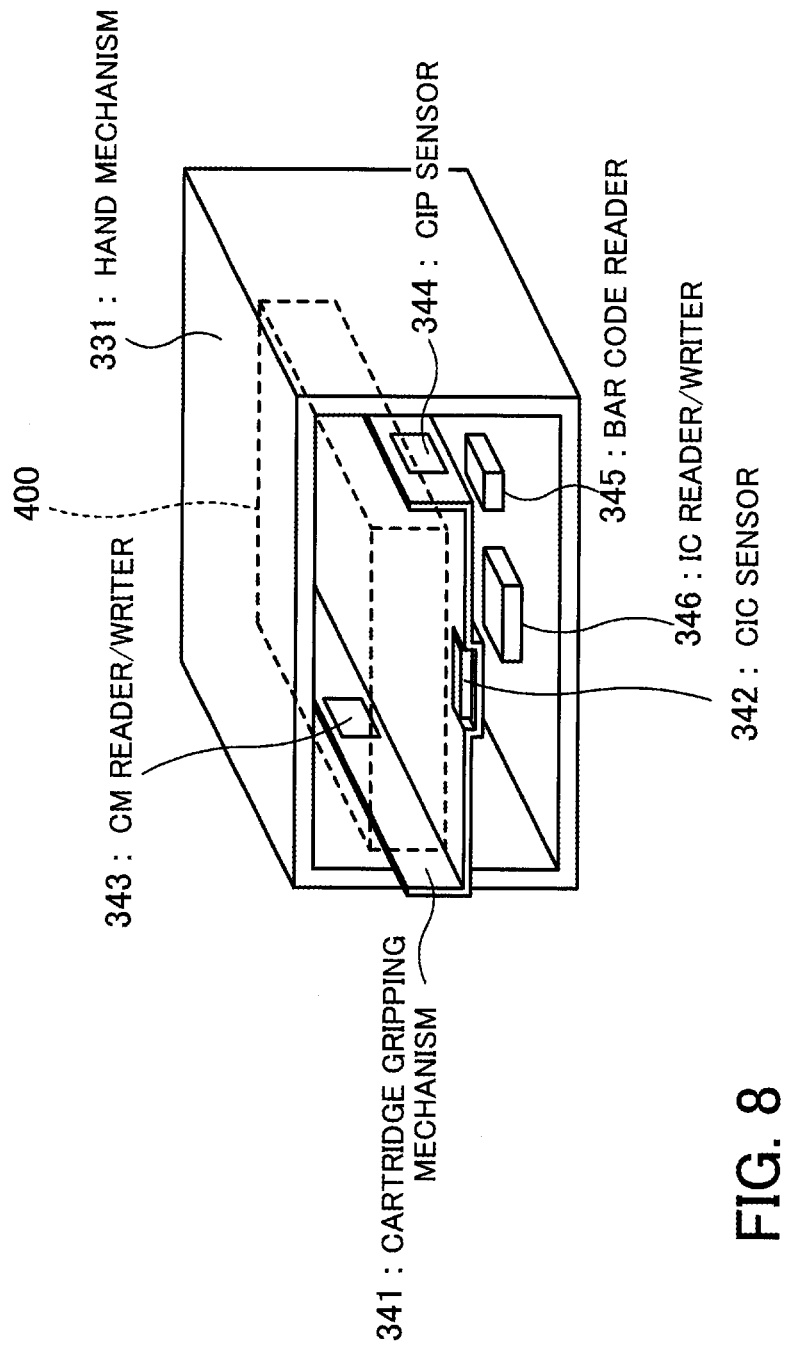
FIG. 8 illustrates exemplary hardware (hand mechanism) of the library device according to the second embodiment.

Next, hardware of the library device 300 will be described, referring to FIGS. 5 to 8. FIG. 5 illustrates exemplary hardware (appearance of the housing) of the library device according to the second embodiment. FIG. 6 illustrates exemplary hardware (interior of the housing) of the library device according to the second embodiment. FIG. 7 illustrates exemplary hardware (robot) of the library device according to the second embodiment. FIG. 8 illustrates exemplary hardware (hand mechanism) of the library device according to the second embodiment.

The library device 300 has an appearance of a housing 311 as illustrated in FIG. 5, for example. The housing 311 has a front upper cover 312, a front lower cover 313, an operator panel 314, and a cartridge slot 315. The front upper cover 312 is a cover which is openable without inserting a key. The front upper cover 312 may have a power switch (not illustrated) mounted thereon.

The front lower cover 313 is a cover which is opened when directly inserting or ejecting the tape cartridge 400 without using the robot 302 or when performing maintenance of the robot 302. The front lower cover 313, having a key hole (not illustrated), is a cover which is openable by inserting a key. The operator panel 314 is a display panel which displays device information of the library device 300. The operator panel 314 has a touch panel function which allows information to be input by a touch operation. For example, the operator panel 314 may be used when giving an instruction to the library device 300.

The cartridge slot 315 is a mechanism to be a window used when inserting or ejecting the tape cartridge 400. When the export process is performed, the tape cartridge 400 is extracted from the cartridge slot 315. Alternatively, when the tape cartridge 400 which has been transported from another center is inserted into the library device 300, the insertion task is performed using the cartridge slot 315.

The interior of the housing 311 has a structure as illustrated in FIG. 6, for example. The interior of the housing 311 has a cartridge delivery mechanism 321 provided therein, in addition to the controller 301, the robot 302, the cell 303, and the drive 304. The cell 303 has the tape cartridge 400 housed therein. The cartridge delivery mechanism 321 may be referred to as a CAS (Cartridge Access Station). In addition, the cartridge delivery mechanism 321 is provided at a position corresponding to the cartridge slot 315.

The drive 304 is a physical drive for reading and writing data. Mounting the tape cartridge 400 on the drive 304 allows reading and writing data from and to the tape cartridge 400 via the drive 304. The robot 302 is a mechanism for transporting the tape cartridge 400 housed in the cell 303 to the drive 304. In addition, the robot 302 is also a mechanism for transporting the tape cartridge 400 to the cell 303 from the drive 304. Furthermore, the robot 302 transports the target tape cartridge 400 to the cartridge delivery mechanism 321 when performing the export process.

The robot 302 has a structure as illustrated in FIG. 7, for example. The robot 302 has a hand mechanism 331, a Z mechanism 332, a Y mechanism 333, and a Y support pole 334.

The hand mechanism 331 is a mechanism for gripping the tape cartridge 400. The Z mechanism 332 is a mechanism for moving the hand mechanism 331 in the Z direction (direction of arrow a) in the drawing. In addition, a swivel mechanism (not illustrated) is provided between the hand mechanism 331 and the Z mechanism 332, whereby the hand mechanism 331 is rotatable in the Z-X plane (in the direction of arrow b). The Y mechanism 333 is a mechanism for moving the hand mechanism 331 in the Y direction (direction of arrow c). The Y mechanism 333 moves in a manner guided by the Y support pole 334.

The hand mechanism 331 has a structure as illustrated in FIG. 8, for example. The hand mechanism 331 has a cartridge gripping mechanism 341, a CIC (Cartridge In Cell) sensor 342, a CM (Cartridge Memory) reader/writer 343, a CIP (Cartridge In Picker) sensor 344, a bar code reader 345 and an IC reader/writer 346.

The cartridge gripping mechanism 341 is a mechanism for gripping the tape cartridge 400. The CIC sensor 342 is a sensor which recognizes whether or not the tape cartridge 400 exists in the cell 303, the cartridge delivery mechanism 321, or the drive 304. The CM reader/writer 343 is a reader/writer for reading and writing information from and to the cartridge memory provided in the tape cartridge 400. The CIP sensor 344 is a sensor which recognizes whether or not the tape cartridge 400 exists in the hand mechanism 331.

The bar code reader 345 is a device which reads information described on a label of the tape cartridge 400. In addition, the bar code reader 345 may have a detecting function of detecting the position of the robot 302. The IC reader/writer 346 is a device which writes information into an electronic paper with an IC-tag 500 via wireless communication (e.g., non-contact communication). In addition, the IC reader/writer 346 is also capable of reading, by wireless communication, information written in the electronic paper with an IC-tag 500.

(Tape Cartridge)

Figure 9:
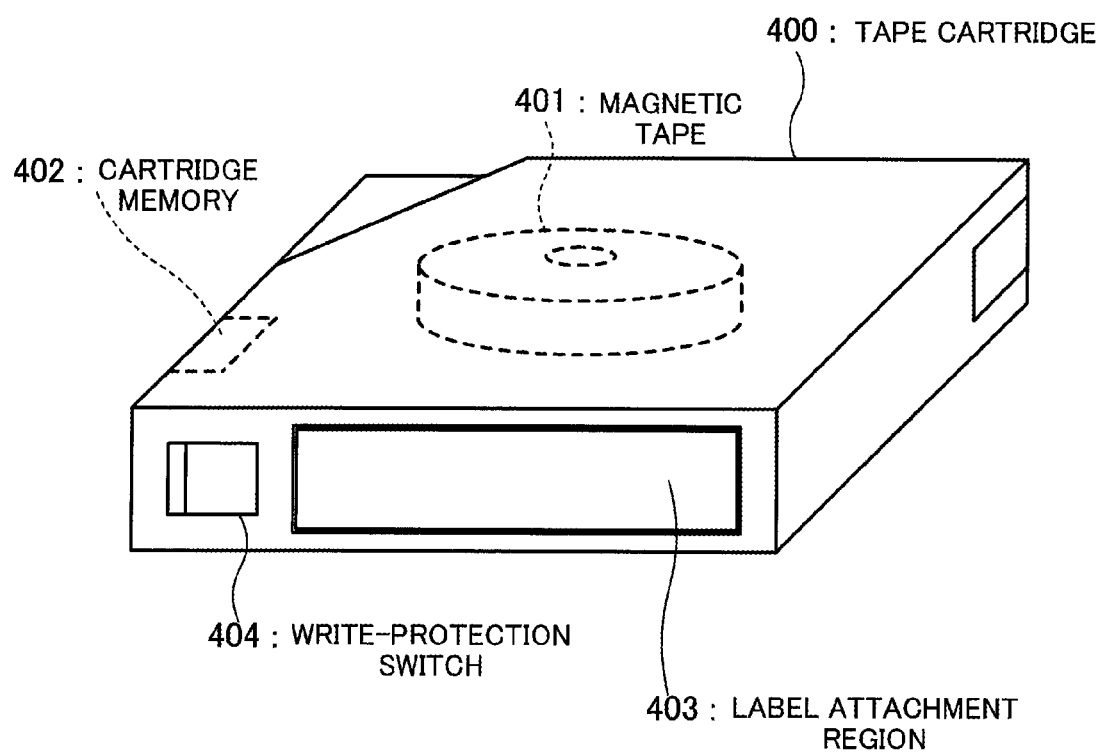
FIG. 9 illustrates exemplary hardware of a tape cartridge according to the second embodiment.

Next, hardware of the tape cartridge 400 will be described, referring to FIG. 9. FIG. 9 illustrates exemplary hardware of the tape cartridge according to the second embodiment.

The tape cartridge 400 has a form as illustrated in FIG. 9, for example. The tape cartridge 400 has a magnetic tape 401, a cartridge memory 402, a label attachment region 403, and a write-protection switch 404. The magnetic tape 401 is a magnetic storage medium in which data of a logical volume is stored. The cartridge memory 402 is an IC memory having a non-contact communication function. The cartridge memory 402 has stored therein management information used by the server device 201 for management.

The aforementioned management information includes information such as PV number, tape library name, belonging-PVG name, PV state, data storage status, or the like. The PV number is an example of information for identifying the tape cartridge 400. The tape library name is an example of information for identifying the library device 300 housing the tape cartridge 400. The belonging-PVG name is an example of information for identifying the PVG to which the tape cartridge 400 belongs. The PV state information indicates the usage status of the tape cartridge 400.

For example, the PV state information includes information indicating the status such as unused, available, abnormal, or the like. The data storage status information includes information such as total capacity, capacity being used, and unused capacity of the magnetic tape 401, a number of logical volumes in which data is stored on the magnetic tape 401, and the like.

The label attachment region 403 has attached thereto a label having identification information (e.g., LV number) for identifying the tape cartridge 400 described thereon. The identification information is described in a display form such as a bar code, for example. Although a paper label may be attached to the label attachment region 403, the electronic paper with an IC-tag 500 described below may also be attached thereto. The write-protection switch 404 is a switch for restricting data writing into the magnetic tape 401. For example, data writing into the magnetic tape 401 is prohibited when the write-protection switch 404 is "ON".

(Data Format)

Figure 10:
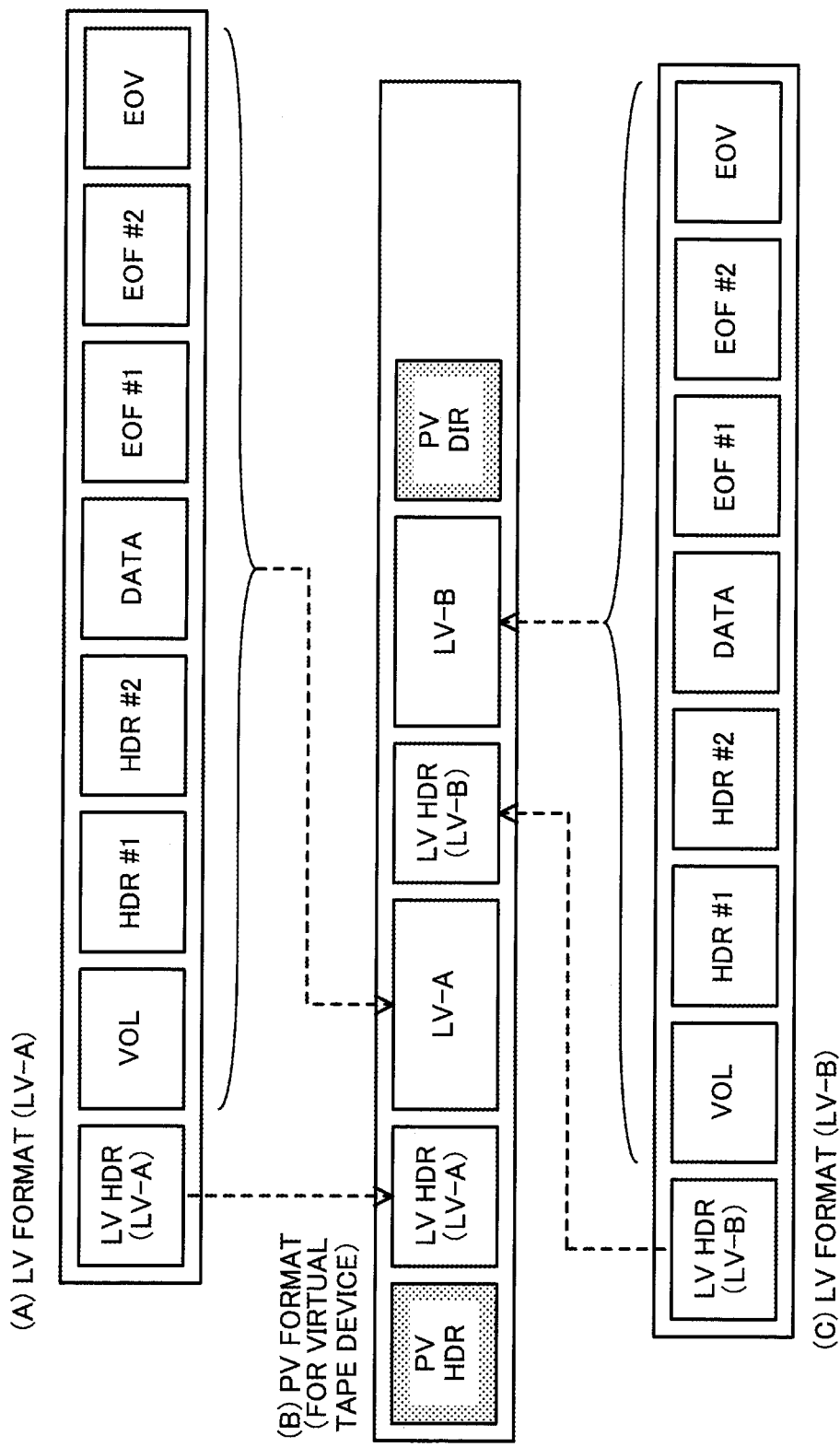
FIG. 10 illustrates an exemplary data format (for a virtual tape device) to be stored on a magnetic tape in the tape cartridge according to the second embodiment.
Figure 11:
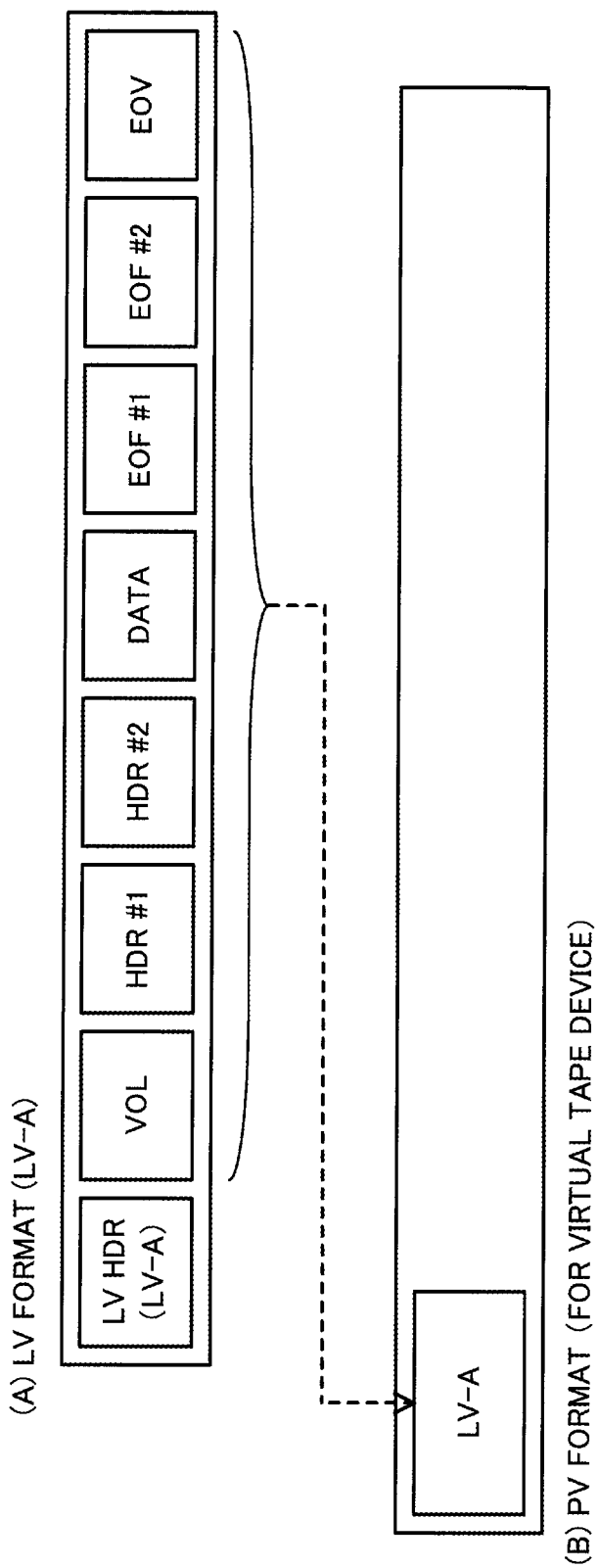
FIG. 11 illustrates an exemplary data format (for a non-virtual tape device) to be stored on a magnetic tape in the tape cartridge according to the second embodiment.

Here, a format of data to be stored on the magnetic tape 401 will be described, referring to FIGS. 10 and 11. FIG. 10 illustrates an exemplary data format (for a virtual tape device) to be stored on a magnetic tape in a tape cartridge according to the second embodiment. FIG. 11 illustrates an exemplary data format (for a non-virtual tape device) to be stored on a magnetic tape in a tape cartridge according to the second embodiment.

The format of a logical volume LV used by the virtual tape device 200 is defined as illustrated in (A) and (C) of FIG. 10.

A VOL (Volume Block) is an 80-byte block in which the volume name, the owner, and the like are written. An HDR #1

(Header 1 Block) is an 80-byte block in which the file name, the update date, and the like are written. A HDR #2 (Header 2 Block) is an 80-byte block in which the record format, the block length, and the like are written. A DATA (Data Block) is a variable-length data block in which the user data is written.

An EOF #1 (End of File 1 Block) is an 80-byte block in which the file name, the update date, and the like are written. An EOF #2 (End of File 2 Block) is an 80-byte block in which the record format, the block length, and the like are written. An EOV (End of Volume) is a mark block indicating the end of the volume. An LV HDR includes information such as generation (number of times the logical volume is updated), LV name (logical volume name), LVG name (logical volume group name), LV size (data size of logical volume), LV creation date (date when the logical volume is created), and the like.

The format of the data to be stored on the magnetic tape 401 (PV format, in the following) when the logical volumes LV-A and LV-B illustrated in (A) and (C) of FIG. 10 are stored on the magnetic tape 401 is such as that illustrated in (B) of FIG. 10. In addition to the logical volumes LV-A and LV-B, PV HDR and PV DIR are stored on the magnetic tape 401. PV HDR includes information such as identifier of the tape cartridge 400, PV name (name of the tape cartridge 400), PVG name (name of belonging-group), identifier of the virtual tape device 200, status flag (flag indicating normal/abnormal), and the like.

PV DIR is a block storing DIR information. The DIR information includes DIR information update date and time, number of LVs, LV total amount, and LV information. The DIR information update date and time indicates the date and time when the DIR information is updated. The number of LV indicates the number of logical volumes in which data has been stored on the magnetic tape 401. The LV total amount indicates the total data amount of all the logical volumes stored on the magnetic tape 401. The LV information includes the LV name, the LV size, and the address on the tape. In addition, the LV information is stored for each logical volume in which data has been stored on the magnetic tape 401. The LV name indicates the logical volume name. The LV size indicates the data size of the logical volume. The address on tape indicates the location where LV HDR has been stored on the magnetic tape 401.

When data is to be read into the virtual tape device 200, the data of the logical volume is stored on the magnetic tape 401 in the format illustrated in FIG. 10. When, on the other hand, data is to be read into a device other than the virtual tape device 200 (e.g., a tape library device connected to the mainframe), the data of the logical volume is stored on the magnetic tape 401 in the format illustrated in FIG. 11.

As illustrated in FIG. 11, the data of the logical volume is stored on the magnetic tape 401 without a block such as PV HDR or PV DIR. Storing the data of the logical volume on the magnetic tape 401 in the aforementioned format allows the data of the logical volume to be also moved to the tape library device or the like which is connected to the mainframe.

(Electronic Paper with an IC-Tag)

Figure 12:
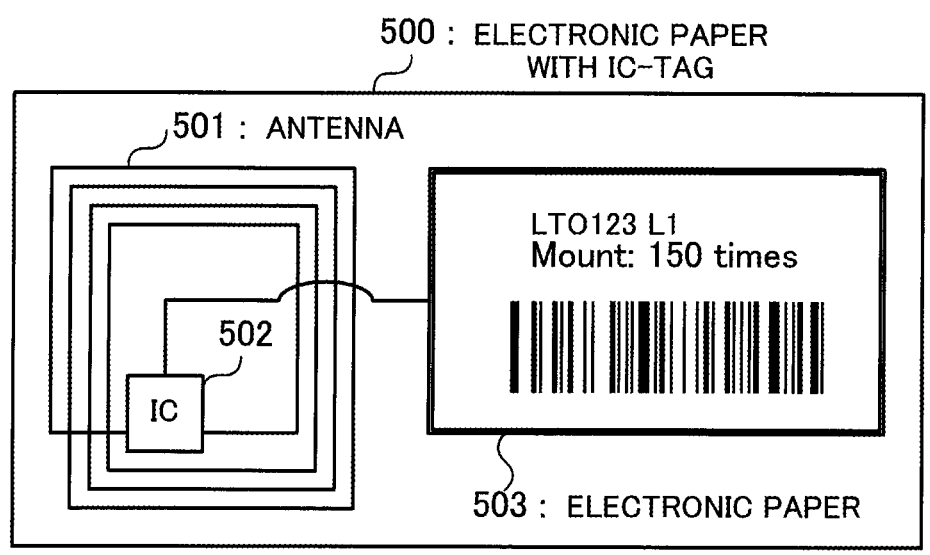
FIG. 12 illustrates exemplary hardware of an electronic paper with an IC-tag according to the second embodiment.

Next, hardware of the electronic paper with an IC-tag 500 will be described, referring to FIG. 12. FIG. 12 illustrates exemplary hardware of the electronic paper with an IC-tag according to the second embodiment.

As illustrated in FIG. 12, the electronic paper with an IC-tag 500 has an antenna 501, an IC chip 502, and an electronic paper 503.

The antenna 501 is a loop antenna of an element formed into a ring-shaped coil, for example. In such a case, induced electromotive force is generated in the element when the magnetic field inside the ring-shaped coil varies. The induced current generated in the element is supplied to the IC chip 502. Therefore, the IC chip 502 is capable of operating using the radio wave received from the IC reader/writer 346 as the power source. The IC chip 502, having a memory (not illustrated), holds information or the like received from the IC reader/writer 346. Additionally, when the information held in the memory is updated, the IC reader/writer 346 rewrites the display on the electronic paper 503 to information in memory.

The electronic paper 503, having a display screen, is a display device which keeps displaying the information displayed on the display screen without consuming electric power. For example, the nature of the electronic paper 503 is realized using an optical material having memory characteristics such as cholesteric liquid crystal. When the IC chip 502 causes the electronic paper 503 to display information, the electronic paper 503 keeps displaying the information without consuming electric power. Although the electronic paper 503 also consumes electric power when rewriting information, the electric power is supplied from the IC chip 502, for example. Although a passive tag system which receives power supply via the antenna 501 is described as an example, an active tag system which operates using a built-in power source, or a semi-passive tag system which uses a built-in power source secondarily is also applicable.

Using the electronic paper with an IC-tag 500 having the aforementioned nature as a label of the tape cartridge 400 makes it possible to easily rewrite the label information using wireless communication by the IC reader/writer 346. In addition, wireless communication allows rewriting of information and thus it is also possible to collectively rewrite the content displayed on a plurality of electronic papers with an IC-tag 500. For example, it becomes possible to set up a plurality of tape cartridges 400 to be available for export, and cause the electronic papers with an IC-tag 500 to display the setting contents concurrently.

Hardware of the device included in the virtual library system 5, and the data structure of the disk array 202, and the like have thus been described above.

2-3. Function of Virtual Tape Device

Figure 13:
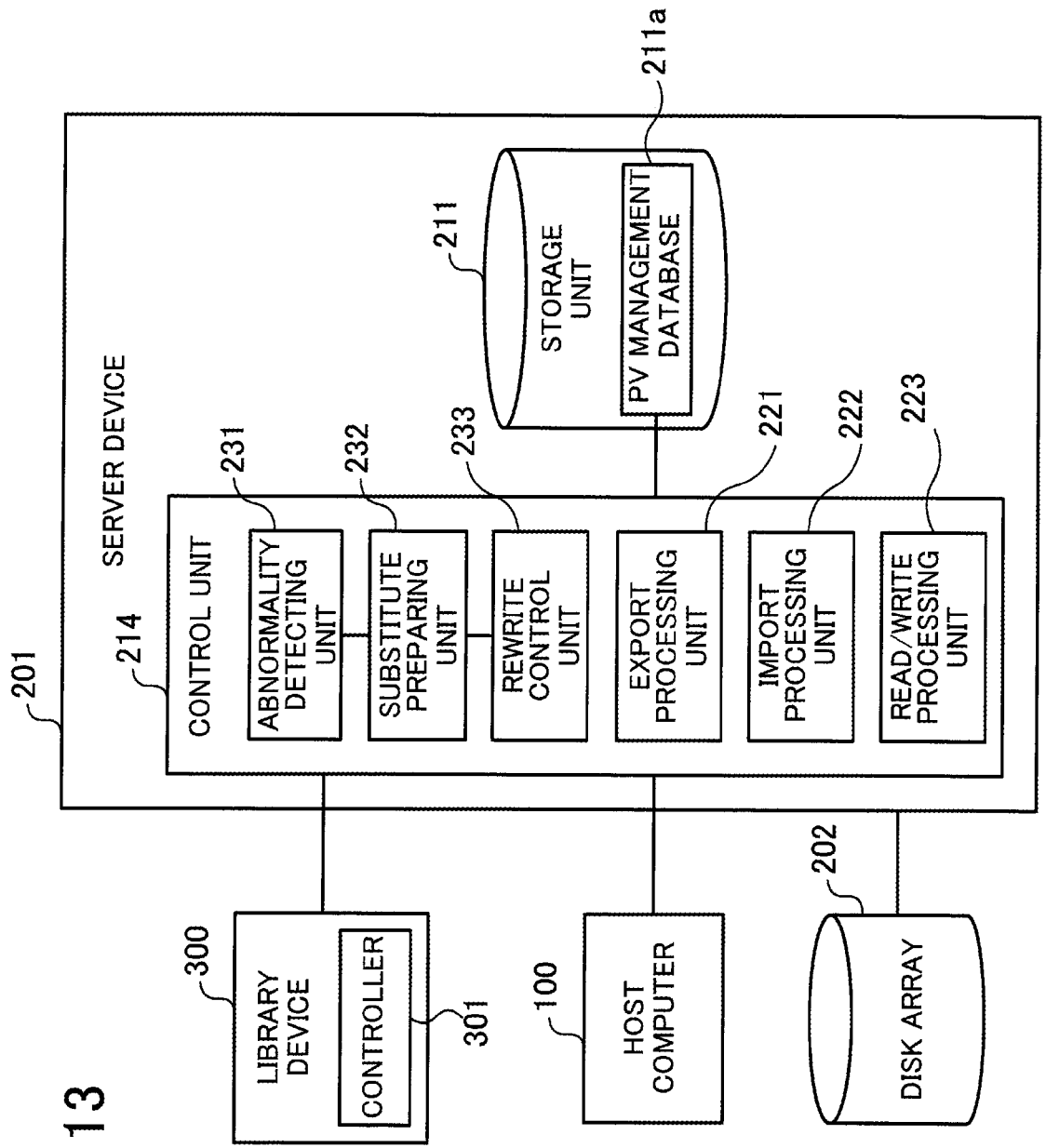
FIG. 13 is a block diagram illustrating an exemplary function of a server device according to the second embodiment.

Next, the function of the server device 201 provided in the virtual tape device 200 will be described, referring to FIGS. 13 and 14. FIG. 13 is a block diagram illustrating an exemplary function of a server device according to the second embodiment. FIG. 14 illustrates exemplary management information managed by the server device according to the second embodiment.

As illustrated in FIG. 13, the server device 201 has a storage unit 211 and a control unit 214. The function of the storage unit 211 may be realized using the RAM 906 and the storage unit 920 described above. The function of the control unit 214 may be realized using the CPU 902 described above.

(Storage Unit 211)

The storage unit 211 stores the data or the like used by the control unit 214. In addition, the storage unit 211 has a PV management database 211a for managing information of the tape cartridge 400. The PV management database 211a includes information such as reference number, PV number, tape library name, belonging-PVG name, PV state, label information, data storage status, and the like, as illustrated in FIG. 14. The reference number is an index of the database. The PV number is an example of information for identifying the tape cartridge 400. The tape library name is an example of information for identifying the library device 300 housing the tape cartridge 400.

The belonging-PVG name is an example of information for identifying PVG to which the tape cartridge 400 belongs. For example, there are a BASE (name of PVG used for backup of one or more logical volumes) or a TR-PVG (name of PVG used when performing import process or export process) as the PVG name. The PV state information indicates the usage status of the tape cartridge 400. For example, the PV state information includes information indicating the status such as unused (-), available (o), being written (wd), being read (rd), abnormal (f), and the like.

The label information indicates whether a paper label (bar code) is attached to the label attachment region 403 of the tape cartridge 400, whether the electronic paper with an IC-tag 500 is attached, or whether or not a label is attached. The electronic paper with an IC-tag 500 may be easily selected by referring to the label information. The data storage status information includes information such as total capacity, capacity being used, and unused capacity of the magnetic tape 401, number of logical volumes in which data is stored on the magnetic tape 401, and the like.

(Control Unit 214)

The control unit 214 includes an export processing unit 221, an import processing unit 222, a read/write processing unit 223, an abnormality detecting unit 231, a substitute preparing unit 232, and a rewrite control unit 233.

The export processing unit 221 writes the data of the logical volume to the tape cartridge 400 of the library device 300, according to the processing request received from the host computer 100, and ejects the tape cartridge 400. The import processing unit 222 recognizes the logical volume stored in the tape cartridge 400 inserted in the library device 300, according to the processing request received from the host computer 100, and writes the data of the logical volume into the disk array 202. The read/write processing unit 223 reads and writes the data of the logical volume stored in the disk array 202, according to the processing request received from the host computer 100.

The abnormality detecting unit 231 detects an abnormality that has occurred while writing data into the tape cartridge 400. For example, the abnormality detecting unit 231 detects that the tape cartridge 400 to which data is to be written is not available when performing the export process. In addition, the abnormality detecting unit 231 detects that the tape cartridge 400 to which data was written when performing the export process is not ejectable from the library device 300. Furthermore, the abnormality detecting unit 231 detects an abnormality that has occurred while performing the export process or the process of writing data into the tape cartridge 400. Upon detecting an abnormality, the abnormality detecting unit 231 notifies the substitute preparing unit 232 of the detection and content of the abnormality.

Upon receiving the notification from the abnormality detecting unit 231, the substitute preparing unit 232 takes measures to continue the process being performed, according to the content of the abnormality. For example, when the tape cartridge 400 fails, the substitute preparing unit 232 prepares a substitute tape cartridge 400. In such a case, the substitute preparing unit 232 selects the tape cartridge 400 attached with the electronic paper with an IC-tag 500. In this occasion, the substitute preparing unit 232 selects the tape cartridge 400 available for writing data as a substitute tape cartridge 400, referring to the PV management database 211a stored in the storage unit 211.

The substitute preparing unit 232 having selected the tape cartridge 400 notifies the rewrite control unit 233 of the result of selection. The rewrite control unit 233 having received the result of selection controls the library device 300 to write the identification information of the logical volume into which data is to be written, into the electronic paper with an IC-tag 500 of the selected tape cartridge 400.

In addition, the rewrite control unit 233 checks whether or not the failed tape cartridge 400 is attached with the electronic paper with an IC-tag 500, referring to the PV management database 211a. When the failed tape cartridge 400 is attached with the electronic paper with an IC-tag 500, the rewrite control unit 233 writes error information into the electronic paper with an IC-tag 500. In addition, the rewrite control unit 233, after rewriting the information of the electronic paper with an IC-tag 500, updates the PV management database 211a.

Accordingly, the interrupted process may be resumed using the substitute tape cartridge 400. In addition, the library device 300 and a user may recognize that the failed tape cartridge 400 is in a failed state. When the tape cartridge 400 is not ejectable due to failure of the robot 302 or the drive 304, the substitute preparing unit 232 controls the library device 300 to continue the process using another robot 302 or drive 304 as a substitute. When there is no other robot 302 or drive 304 as a substitute, the substitute preparing unit 232 notifies the host computer 100 of an abnormal termination.

The function of the server device 201 provided in the virtual tape device 200 has thus been described above.

2-4. Function of Library Device

Figure 15:
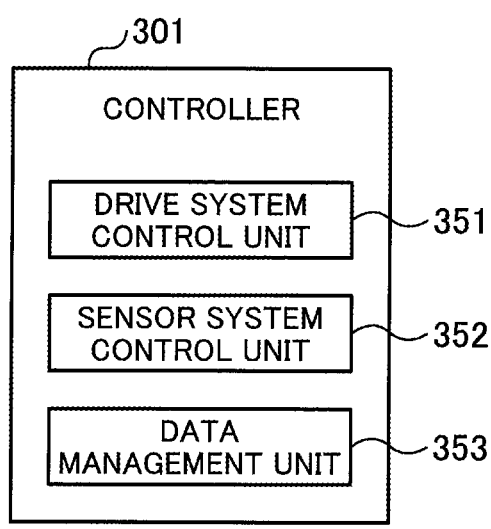
FIG. 15 is a block diagram illustrating an exemplary function of a controller of the library device according to the second embodiment.

Next, the function of the controller 301 provided in the library device 300 will be described, referring to FIG. 15. FIG. 15 is a block diagram illustrating an exemplary function of the controller of the library device according to the second embodiment.

The controller 301 has a drive system control unit 351, a sensor system control unit 352, and a data management unit 353. The drive system control unit 351, the sensor system control unit 352, and the data management unit 353 may be a processor such as a CPU or a DSP. The drive system control unit 351, the sensor system control unit 352, and the data management unit 353 may be an electronic circuit other than a processor such as an ASIC or an FPGA. The drive system control unit 351, the sensor system control unit 352, and the data management unit 353 execute programs stored in a memory such as a ROM (not illustrated) and a RAM (not illustrated).

The drive system control unit 351 controls the operation of the robot 302. For example, the drive system control unit 351 performs drive control of the cartridge gripping mechanism 341 of the hand mechanism 331, the Z mechanism 332, the Y mechanism 333, the swivel mechanism, or the like. The sensor system control unit 352 controls the operations of the CIC sensor 342, the CM reader/writer 343, the CIP sensor 344, the bar code reader 345, and the IC reader/writer 346.

The data management unit 353 performs a process of transmitting and receiving data to and from the server device 201, or a process of reading and writing data from and to the tape cartridge 400 mounted on the drive 304. In addition, the data management unit 353 performs a process of reading and writing data from and to the cartridge memory 402 via the CM reader/writer 343. Furthermore, the data management unit 353 performs a process of reading and writing data from and to the electronic paper with an IC-tag 500 via the IC reader/writer 346.

The function of the controller 301 provided in the library device 300 has thus been described above.

2-5. Process Flow of Exporting

Figure 16:
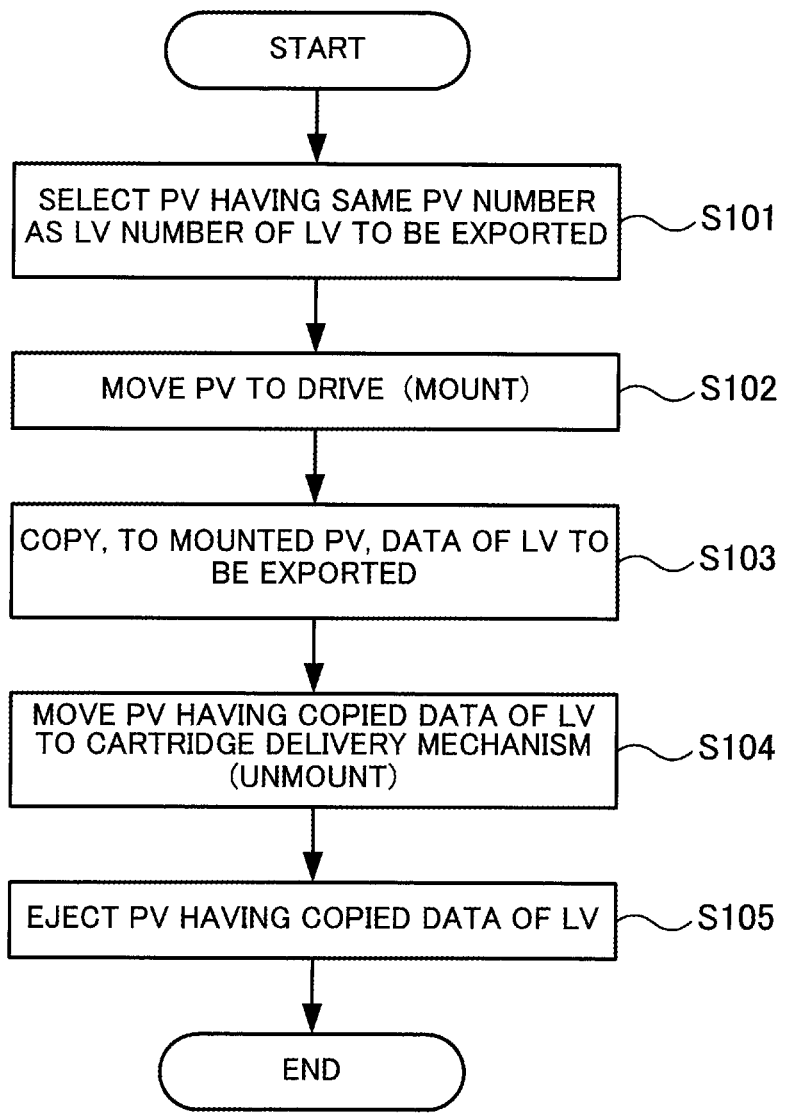
FIG. 16 is a flow chart illustrating an exemplary export process according to the second embodiment.

Next, the process flow of exporting will be described.
(Basic Process Flow)
First, a basic process flow will be described, referring to FIG. 16. FIG. 16 is a flow chart illustrating an exemplary export process according to the second embodiment.

(S101) The export processing unit 221 of the server device 201 prepares the tape cartridge 400 having the same PV number as the identification information (LV number) of the logical volume to be written out to the tape cartridge 400. In this occasion, the export processing unit 221 selects the tape cartridge 400 having the same PV number as the LV number corresponding to the logical volume to be written out, referring to the PV management database 211a. The export processing unit 221 then controls the controller 301 of the library device 300 to mount the selected tape cartridge 400 on the drive 304.

(S102) The controller 301 of the library device 300 controls the robot 302 to extract the tape cartridge 400 selected by the export processing unit 221 from the cell 303 and move the tape cartridge 400 to the drive 304. In this occasion, the controller 301 sequentially reads the label information described in the label attachment region 403 of the tape cartridge 400 within the cell 303. The controller 301 then moves the tape cartridge 400 having the same label information as the PV number of the tape cartridge 400 selected by the export processing unit 221.

(S103) The export processing unit 221 of the server device 201 writes the data of the logical volume into the tape cartridge 400 which has been mounted on the drive 304 by the controller 301 of the library device 300. Upon completion of writing the data of the logical volume, the export processing unit 221 controls the controller 301 to eject the tape cartridge 400 out of the library device 300.

(S104, S105) The controller 301 of the library device 300 controls the robot 302 to move the tape cartridge 400 on which the data of the logical volume written is written to the cartridge delivery mechanism 321. The tape cartridge 400 which has been moved to the cartridge delivery mechanism 321 is then ejected out of the cartridge slot 315. When the process of S105 terminates, the series of processes illustrated in FIG. 16 are completed. When no abnormality occurs when the export process is performed, the process advances according to the flow as described above.

(Process Flow in Consideration of Occurrence of Abnormality)
Next, a process flow in consideration of occurrence of abnormality will be described, referring to FIGS. 17 to 21.

Figure 17:
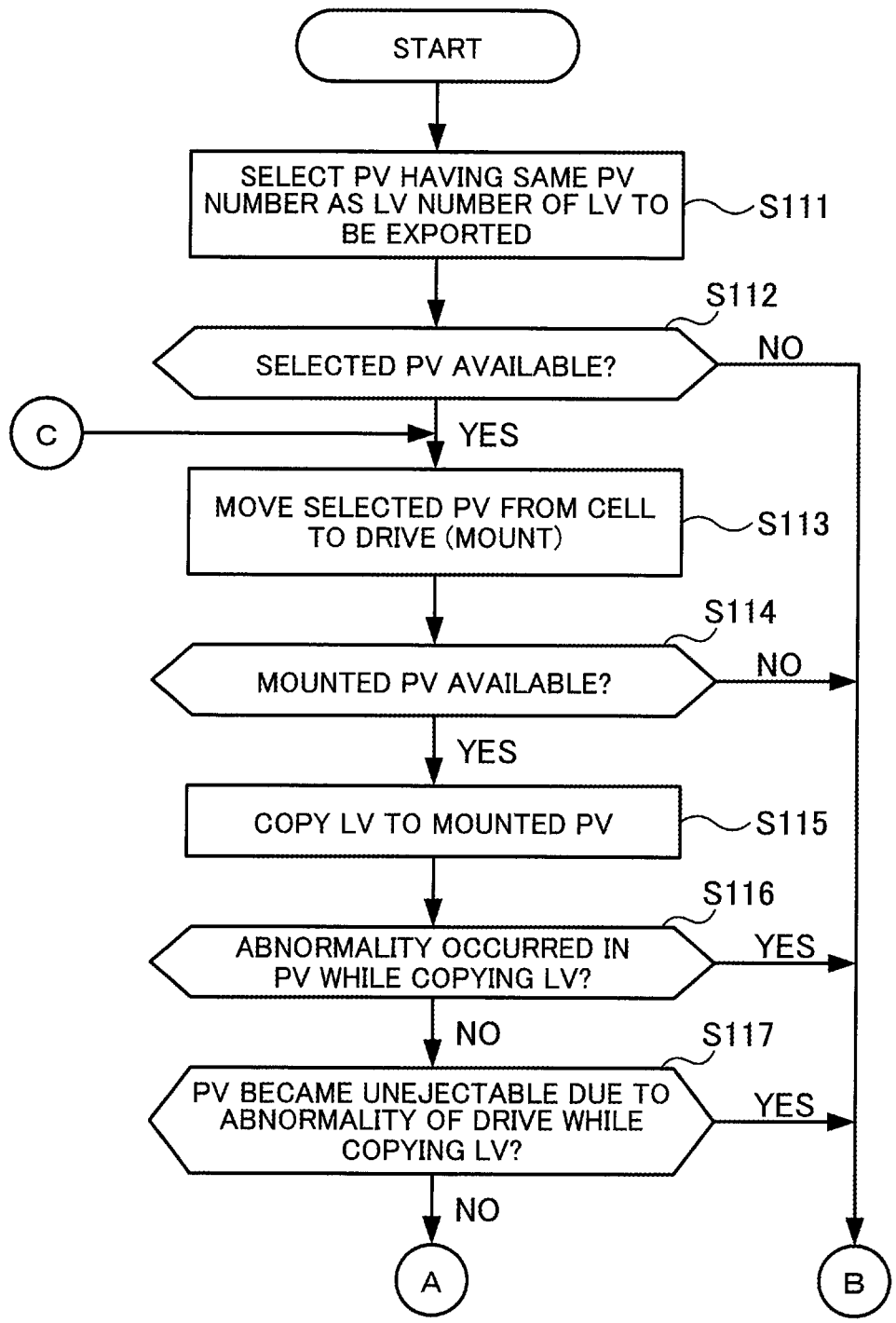
FIG. 17 is a first flow chart illustrating an exemplary export process (in consideration of occurrence of abnormality) according to the second embodiment.
Figure 18:
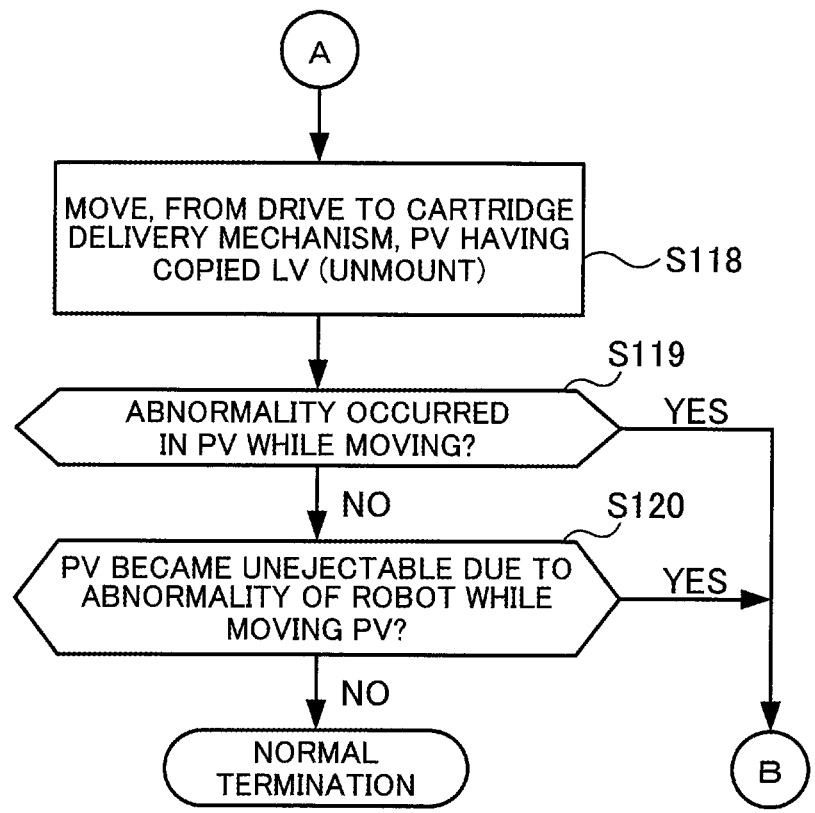
FIG. 18 is a second flow chart illustrating an exemplary export process (in consideration of occurrence of abnormality) according to the second embodiment.
Figure 19:
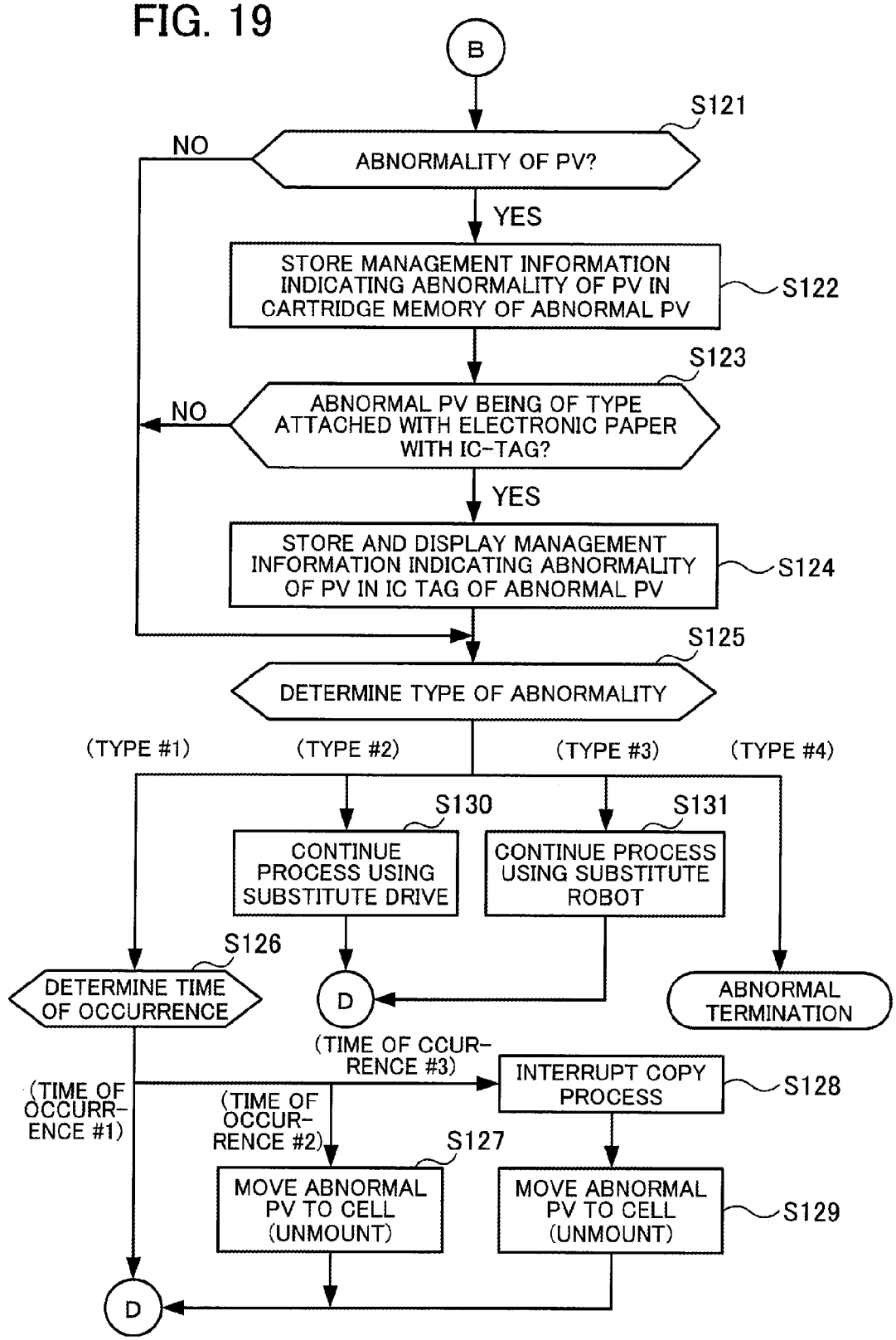
FIG. 19 is a third flow chart illustrating an exemplary export process (in consideration of occurrence of abnormality) according to the second embodiment.
Figure 20:
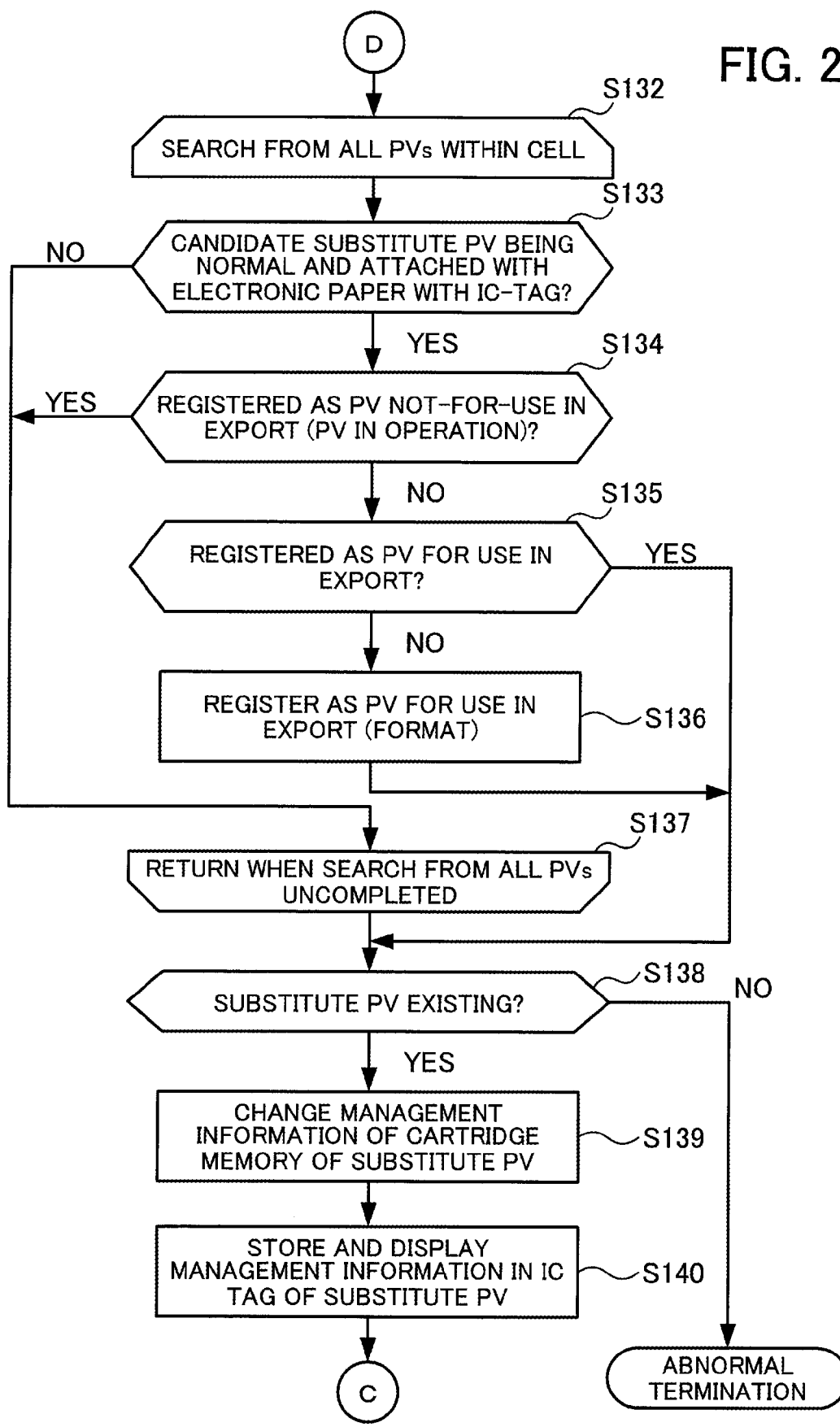
FIG. 20 is a fourth flow chart illustrating an exemplary export process (in consideration of occurrence of abnormality) according to the second embodiment.

FIG. 17 is a first flow chart illustrating an exemplary export process (in consideration of occurrence of abnormality) according to the second embodiment. FIG. 18 is a second flow chart illustrating an exemplary export process (in consideration of occurrence of abnormality) according to the second embodiment. FIG. 19 is a third flow chart illustrating an exemplary export process (in consideration of occurrence of abnormality) according to the second embodiment. FIG. 20 is a fourth flow chart illustrating an exemplary export process (in consideration of occurrence of abnormality) according to the second embodiment. FIG. 21 illustrates a branch condition of a branching process included in the exemplary export process (in consideration of occurrence of abnormality) according to the second embodiment.

(S111) The export processing unit 221 of the server device 201 prepares the tape cartridge 400 having the same PV number as the identification information (LV number) of the logical volume to be written out to the tape cartridge 400. In this occasion, the export processing unit 221 selects the tape cartridge 400 having the same PV number as the LV number corresponding to the logical volume to be written out, referring to the PV management database 211a.

(S112) The export processing unit 221 of the server device 201 determines whether or not the tape cartridge 400 selected at S111 is available. For example, the export processing unit 221 determines the availability based on information of the PV management database 211a or the cartridge memory 402 of the tape cartridge 400. When the tape cartridge 400 selected at S111 is available, the process proceeds to S113. When, on the other hand, the tape cartridge 400 selected at S111 is not available, the process proceeds to S121 (FIG. 19).

(S113) The export processing unit 221 of the server device 201 controls the controller 301 of the library device 300 to mount the selected tape cartridge 400 on the drive 304. The controller 301 of the library device 300 controls the robot 302 to extract the tape cartridge 400 selected by the export processing unit 221 from the cell 303 and move the tape cartridge 400 to the drive 304. In this occasion, the controller 301 sequentially reads the label information described in the label attachment region 403 of the tape cartridge 400 within the cell 303. The controller 301 then moves the tape cartridge 400 having the same label information as the PV number of the tape cartridge 400 selected by the export processing unit 221.

(S114) The control unit 214 of the server device 201 monitors whether or not an abnormality has occurred in the tape cartridge 400 during the process of moving the tape cartridge 400 to the drive 304. For example, the control unit 214 checks whether or not writing data into the tape cartridge 400 mounted on the drive 304 has been enabled. When the tape cartridge 400 mounted on the drive 304 is available, the process proceeds to S115. When, on the other hand, an abnormality has occurred in the tape cartridge 400 and thus the tape cartridge 400 mounted on the drive 304 is not available, the process proceeds to S121 (FIG. 19).

(S115) The export processing unit 221 of the server device 201 writes the data of the logical volume into the tape cartridge 400 which has been mounted on the drive 304 by the controller 301 of the library device 300.

(S116) The control unit 214 of the server device 201 monitors whether or not an abnormality has occurred in the tape cartridge 400 during the process of writing the data of the logical volume into the tape cartridge 400. For example, the control unit 214 checks whether or not the process of writing the data into the tape cartridge 400 has abnormally terminated. When the process of writing the data into the tape cartridge 400 has normally terminated, the export processing unit 221 controls the controller 301 to eject the tape cartridge 400 out of the library device 300. The process then proceeds to S117. When, on the other hand, the process of writing the data into the tape cartridge 400 has abnormally terminated, the process proceeds to S121 (FIG. 19).

(S117) The control unit 214 of the server device 201 monitors whether or not an abnormality has occurred in the drive 304 during the process of moving the tape cartridge 400 from the drive 304 to the cartridge delivery mechanism 321. When the tape cartridge 400 has not entered a state of being unable to move to the cartridge delivery mechanism 321 due to the abnormality that has occurred in the drive 304, the process proceeds to S118 (FIG. 18). When, on the other hand, the tape cartridge 400 is unable to move to the cartridge delivery mechanism 321 due to the abnormality that has occurred in the drive 304, the process proceeds to S121 (FIG. 19).

(S118) The controller 301 of the library device 300 controls the robot 302 to move the tape cartridge 400 on which the data of the logical volume is written to the cartridge delivery mechanism 321.

(S119) The control unit 214 of the server device 201 monitors whether or not an abnormality has occurred in the tape cartridge 400 during the process of moving the tape cartridge 400 from the drive 304 to the cartridge delivery mechanism 321. When no abnormality has occurred in the tape cartridge 400 while the tape cartridge 400 moves from the drive 304 to the cartridge delivery mechanism 321, the process proceeds to S120. When, on the other hand, an abnormality has occurred in the tape cartridge 400 while the tape cartridge 400 moves from the drive 304 to the cartridge delivery mechanism 321, the process proceeds to S121 (FIG. 19).

(S120) The control unit 214 of the server device 201 monitors whether or not an abnormality has occurred in the robot 302 during the process of moving the tape cartridge 400 from the drive 304 to the cartridge delivery mechanism 321.

When the tape cartridge 400 has not entered a state of being unable to move to the cartridge delivery mechanism 321 due to the abnormality that has occurred in the robot 302 while moving the tape cartridge 400 from the drive 304 to the cartridge delivery mechanism 321, the process normally terminates. When, on the other hand, the tape cartridge 400 is unable to move to the cartridge delivery mechanism 321 due to the abnormality that has occurred in the robot 302 while moving the tape cartridge 400 from the drive 304 to the cartridge delivery mechanism 321, the process proceeds to S121 (FIG. 19).

(S121) The control unit 214 of the server device 201 determines whether or not the type of abnormality is an abnormality of the tape cartridge 400. When the type of abnormality is an abnormality of the tape cartridge 400, the process proceeds to S122. When, on the other hand, the type of abnormality is not an abnormality of the tape cartridge 400, the process proceeds to S125.

(S122) The control unit 214 of the server device 201 controls the controller 301 of the library device 300 to store management information indicating that the PV state is "abnormal", in the cartridge memory 402 of the tape cartridge 400 in which an abnormality has occurred. Additionally, in the cartridge memory 402 of the tape cartridge 400 that abnormality has occurred, the control unit 214 updates the PV state of the PV management database 211a to "abnormal".

(S123) The control unit 214 of the server device 201 determines whether or not the electronic paper with an IC-tag 500 is attached to the label attachment region 403 of the tape cartridge 400 in which an abnormality has occurred, referring to the PV management database 211a. When the electronic paper with an IC-tag 500 is attached to the label attachment region 403 of the tape cartridge 400 in which an abnormality has occurred, the process proceeds to S124. When, on the other hand, the electronic paper with an IC-tag 500 is not attached to the label attachment region 403 of the tape cartridge 400 in which an abnormality has occurred, the process proceeds to S125.

(S124) The control unit 214 of the server device 201 controls the controller 301 of the library device 300 to rewrite the display of the electronic paper with an IC-tag 500 attached to the label attachment region 403 of the tape cartridge 400 in which an abnormality has occurred. For example, the control unit 214 causes the electronic paper with an IC-tag 500 to display management information indicating that the PV state of the tape cartridge 400 is "abnormal".

(S125) The control unit 214 of the server device 201 determines the type of abnormality that has occurred during the export process. In this occasion, the control unit 214 determines the type of abnormality based on the branch conditions of types #1 to #4 illustrated in FIG. 21.

The branch condition of type #1 is set as "tape cartridge 400 for use in export being not available". The branch condition of type #2 is set as "abnormality occurred in drive 304 when writing data of logical volume into tape cartridge 400, ejection of tape cartridge 400 being prevented, and substitute drive 304 existing". The branch condition of type #3 is set "abnormality occurred in robot 302 gripping tape cartridge 400, ejection of tape cartridge 400 being prevented, and substitute robot 302 existing". The branch condition of type #4 is set as "abnormality other than types #1 to #3 occurred".

When the branch condition is of type #1, the process proceeds to S126. When the branch condition is of type #2, the process proceeds to S130. When the branch condition is of type #3, the process proceeds to S131. When the branch condition is of type #4, the process abnormally terminates.

(S126) The control unit 214 of the server device 201 determines the time of occurrence of the abnormality in the export process. In this occasion, the control unit 214 determines the time of occurrence of the abnormality based on branch conditions of times #1 to #3 illustrated in FIG. 21.

The branch condition of time #1 is set as "before moving tape cartridge 400 to drive 304". The branch condition of time #2 is set as "while moving tape cartridge 400 to drive 304, cell 303, or cartridge delivery mechanism 321". The branch condition of time #3 is set as "while writing data of logical volume into tape cartridge 400".

When the branch condition is of time #1, the process proceeds to S132 (FIG. 20). When the branch condition is of time #2, the process proceeds to S127. When the branch condition is of time #3, the process proceeds to S128.

(S127) The control unit 214 of the server device 201 controls the controller 301 of the library device 300 to move the tape cartridge 400 in which an abnormality has occurred to the cell 303. Upon completion of the process of S127, the process proceeds to S132 (FIG. 20).

(S128, S129) The control unit 214 of the server device 201 interrupts writing data into the tape cartridge 400. The control unit 214 then controls the controller 301 of the library device 300 to move the tape cartridge 400 in which an abnormality has occurred to the cell 303. Upon completion of the process of S129, the process proceeds to S132 (FIG. 20).

(S130) The control unit 214 of the server device 201 selects a substitute drive 304, and controls the controller 301 of the library device 300 to continue the process using the substitute drive 304. Upon completion of the process of S130, the process proceeds to S132 (FIG. 20).

(S131) The control unit 214 of the server device 201 selects a substitute robot 302, and controls the controller 301 of the library device 300 to continue the process using the substitute robot 302. Upon completion of the process of S131, the process proceeds to S132 (FIG. 20).

(S132) A process of searching for a substitute tape cartridge 400 is performed for all the tape cartridges 400 within the cell 303 of the library device 300. The control unit 214 of the server device 201 selects one of the tape cartridges 400 housed within the cell 303 as a candidate of a substitute tape cartridge 400.

(S133) The control unit 214 of the server device 201 checks whether or not the tape cartridge 400 selected as a candidate is in a normal PV state and attached with the electronic paper with an IC-tag 500. In this occasion, the control unit 214 refers to the PV management database 211*a* or information of the cartridge memory 402 of the tape cartridge 400.

When the tape cartridge 400 selected as a candidate is in a normal PV state and attached with the electronic paper with an IC-tag 500, the process proceeds to S134. When, on the other hand, the PV state of the tape cartridge 400 selected as a candidate is abnormal, or not attached with the electronic paper with an IC-tag 500, the process proceeds to S137.

(S134) The control unit 214 of the server device 201 checks whether or not the PV state of the tape cartridge 400 selected as a candidate has been registered as not-for-use in export. In this occasion, the control unit 214 refers to the PV management database 211*a* or information of the cartridge memory 402 of the tape cartridge 400.

When the PV state of the tape cartridge 400 selected as a candidate has been registered as not-for-use in export (when the PV state is being written (wd) or being read (rd)), the process proceeds to S137. When, on the other hand, the PV state of the tape cartridge 400 selected as a candidate has not been registered as not-for-use in export (when the PV state is unused (−) or available (o)), the process proceeds to S135.

(S135) The control unit 214 of the server device 201 checks whether or not the PV state of the tape cartridge 400 selected as a candidate has been registered for use in export. In this occasion, the control unit 214 refers to the PV management database 211*a* or information of the cartridge memory 402 of the tape cartridge 400.

When the PV state of the tape cartridge 400 selected as a candidate has been registered for use in export (when the PV state is available (o)), the process proceeds to S138. When, on the other hand, the PV state of the tape cartridge 400 selected as a candidate has not been registered for use in export (when PV state is unused (−)), the process proceeds to S136.

(S136) The control unit 214 of the server device 201 formats the tape cartridge 400 selected as a candidate to be available for the export process. After the formatting, the control unit 214 changes the PV state stored in the cartridge memory 402 of the PV management database 211*a* and the tape cartridge 400 to available (o). Accordingly, the tape cartridge 400 which has been selected as a candidate is registered for use in export.

(S137) Upon completion of the search process for all the tape cartridges 400 in the cell 303, the process proceeds to S138. When, on the other hand, the search process has not completed for all the tape cartridges 400 in the cell 303, the processes of, and subsequent to, S132 are performed for the tape cartridges 400 for which the search process has not yet completed.

(S138) The control unit 214 of the server device 201 determines whether or not a substitute tape cartridge 400 has been detected. When a substitute tape cartridge 400 has been detected (when the process of S135 or S136 is entered), the process proceeds to S139. When, on the other hand, no substitute tape cartridge 400 has been detected, the process abnormally terminates.

(S139) The control unit 214 of the server device 201 updates the management information stored in the cartridge memory 402 of the substitute tape cartridge 400. For example, the control unit 214 rewrites the PV number stored in the cartridge memory 402 of the substitute tape cartridge 400 with the PV number of the failed tape cartridge 400.

(S140) The control unit 214 of the server device 201 updates the management information displayed on the electronic paper with an IC-tag 500 of the substitute tape cartridge 400. For example, the control unit 214 changes the PV number displayed on the electronic paper with an IC-tag 500 of the substitute tape cartridge 400 to the PV number of the failed tape cartridge 400. Upon completion of the process of S140, the process proceeds to S113 (FIG. 17).

According to the process flow described above, it becomes possible to automatically prepare a substitute tape cartridge 400 and continue the export process, even when an abnormality has occurred.

(Exemplary Display of Electronic Paper with an IC-Tag)

Here, the process of rewriting the display content on the electronic paper with an IC-tag 500 performed at S124 or S140 will be further described, referring to FIGS. 22 and 23. FIG. 22 illustrates an exemplary rewriting method of management information according to the second embodiment. FIG. 23 illustrates an exemplary writing method of management information according to the second embodiment.

(A) of FIG. 22 is an example of rewriting the display on an electronic paper with an IC-tag 500 attached to a substitute tape cartridge 400 registered for export. In the example illustrated in (A) of FIG. 22, the PV number displayed on the electronic paper with an IC-tag 500 is rewritten from "LTO123" to "LTO789". In this occasion, the bar code describing the PV number is also rewritten. According to the rewriting, it becomes possible to use the substitute tape cartridge 400 as the tape cartridge 400 having the PV number "LTO789".

(B) of FIG. 22 is an example of rewriting the display on an electronic paper with an IC-tag 500 attached to a failed tape cartridge 400. In the example illustrated in (B) of FIG. 22, management information such as the PV number displayed on the electronic paper with an IC-tag 500 is erased and rewritten by error information including date of failure, display of abnormality (Media Error), and code indicating type of abnormality (0x0123). The rewriting avoids selecting the failed tape cartridge 400 as the tape cartridge 400 having the PV number "LTO123". Furthermore, it becomes possible for the user to easily recognize the failure of the tape cartridge 400.

(C) of FIG. 22 is an example of rewriting the display on an electronic paper with an IC-tag 500 attached to a tape cartridge 400 whose limit number of times used has been exceeded. In the example illustrated in (C) of FIG. 22, the bar code or the like indicating the PV number displayed on the electronic paper with an IC-tag 500 has been erased and rewritten to error information indicating the cause of the abnormality. Erasing the bar code results in avoidance of selecting the tape cartridge 400 whose limit number of times used has been exceeded as the tape cartridge 400 having the PV number "LTO123". Furthermore, it becomes possible for the user to easily recognize the content of the abnormality of the tape cartridge 400.

(D) of FIG. 22 is an example of rewriting the display on an electronic paper with an IC-tag 500 attached to a tape cartridge 400 whose limit number of times written has been exceeded. In the example illustrated in (D) of FIG. 22, the bar code or the like indicating the PV number displayed on the electronic paper with an IC-tag 500 has been erased and rewritten to error information indicating the cause of the abnormality. Erasing the bar code results in avoidance of selecting the tape cartridge 400 whose limit number of times written has been exceeded as the tape cartridge 400 having the PV number "LTO123". Furthermore, it becomes possible for the user to easily recognize the content of the abnormality of the tape cartridge 400.

(E) of FIG. 23 is an example of rewriting the display on an electronic paper with an IC-tag 500 attached to an unused tape cartridge 400. In the example illustrated in (E) of FIG. 23, information displayed on the electronic paper with an IC-tag 500 is erased and rewritten to a PV number and a bar code indicating the PV number. According to the rewriting, it becomes possible to use the substitute tape cartridge 400 as the tape cartridge 400 having the PV number "LTO123".

(F) of FIG. 23 is an example of rewriting the display on an electronic paper with an IC-tag 500 attached to an unregistered tape cartridge 400. In the example illustrated in (F) of FIG. 23, information displayed on the electronic paper with an IC-tag 500 is erased and rewritten to a PV number and a bar code indicating the PV number. According to the rewriting, it becomes possible to use the substitute tape cartridge 400 as the tape cartridge 400 having the PV number "LTO123".

Examples of the process of rewriting the display content on the electronic paper with an IC-tag 500 has thus been described above.

Although embodiments of the invention have been described above referring to accompanying drawings, the invention is not limited to the related examples. It is clear that those skilled in the art may conceive various variations and modifications in a range described within the scope of the claims, and it goes without saying that such variations and modifications also belong to the technical range of the invention.

According to the invention, it becomes possible to accelerate writing data out to a substitute storage medium in the event of an abnormality.

All examples and conditional language provided herein are intended for the pedagogical purposes of aiding the reader in understanding the invention and the concepts contributed by the inventor to further the art, and are not to be construed as limitations to such specifically recited examples and conditions, nor perform the organization of such examples in the specification relate to a illustrating of the superiority and inferiority of the invention. Although one or more embodiments of the invention have been described in detail, it should be understood that various changes, substitutions, and alterations could be made hereto without departing from the spirit and scope of the invention.

What is claimed is:

1. A data management apparatus comprising:
   a first storage unit configured to store data associated with first identification information;
   a first selecting unit configured to select a first storage medium on which first identification information corresponding to data to be written out is displayed, from among a plurality of storage media, when writing the data out to a storage medium; and
   a second selecting unit configured to select a second storage medium attached with a display unit configured to display stored information, from among the plurality of storage media, and store the first identification information in the display unit of the second storage medium, when the first storage medium is not available.

2. The data management apparatus according to claim 1, further comprising a second storage unit configured to store, for each of the plurality of storage media, management information associating second identification information identifying said each storage medium with information indicating presence or absence of a display unit, wherein
   the second selecting unit selects the second storage medium based on the management information.

3. The data management apparatus according to claim 1, wherein, when the first storage medium is not available and the first storage medium is attached with a display unit, the second selecting unit stores predetermined error information in place of the first identification information, in the display unit of the first storage medium.

4. The data management apparatus according to claim 3, wherein, when the first storage medium is not available and the first storage medium is attached with the display unit, the second selecting unit stores information indicating a cause of unavailability of the first storage medium, in the display unit of the first storage medium.

5. The data management apparatus according to claim 2, wherein
   the management information includes status information indicating whether or not a storage medium corresponding to the second identification information is available for write-out of the data, and
   the second selecting unit selects the second storage medium available for write-out of the data based on the information indicating presence or absence of the display unit and the status information.

6. A control method of a data management apparatus comprising:
   selecting, by a control unit of the data management apparatus configured to read data from a storage unit storing data associated with identification information and write the data out to a storage medium, a first storage medium on which identification information corresponding to the data to be written out is displayed, from among a plurality of storage media; and
   selecting, by the control unit, a second storage medium attached with a display unit configured to display stored information, from among the plurality of storage media, and storing the identification information in the display unit of the second storage medium, when the first storage medium is not available.

* * * * *